US012562802B2

(12) United States Patent
Wang

(10) Patent No.: US 12,562,802 B2
(45) Date of Patent: Feb. 24, 2026

(54) BEAM SIGNAL TRANSMISSION METHOD AND APPARATUS, AND NETWORK SIDE NODE AND TERMINAL

(71) Applicant: DATANG MOBILE COMMUNICATIONS EQUIPMENT CO., LTD., Beijing (CN)

(72) Inventor: Junwei Wang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 188 days.

(21) Appl. No.: 18/552,814

(22) PCT Filed: Mar. 15, 2022

(86) PCT No.: PCT/CN2022/080914
§ 371 (c)(1),
(2) Date: Sep. 27, 2023

(87) PCT Pub. No.: WO2022/206368
PCT Pub. Date: Oct. 6, 2022

(65) Prior Publication Data
US 2024/0162967 A1      May 16, 2024

(30) Foreign Application Priority Data

Apr. 2, 2021    (CN) .......................... 202110363872.4

(51) Int. Cl.
*H04B 7/06*          (2006.01)
*H04W 72/044*        (2023.01)
*H04W 72/0446*       (2023.01)

(52) U.S. Cl.
CPC .... *H04B 7/06952* (2023.05); *H04W 72/0446* (2013.01); *H04W 72/046* (2013.01)

(58) Field of Classification Search
CPC ............... H04B 7/06952; H04B 7/024; H04W 72/0446; H04W 72/046
See application file for complete search history.

(56) References Cited

U.S. PATENT DOCUMENTS

2017/0054534 A1      2/2017  Sang et al.
2018/0343679 A1     11/2018  Sahlin et al.
(Continued)

FOREIGN PATENT DOCUMENTS

CN        107210796 A      9/2017
CN        109151841 A      1/2019
(Continued)

OTHER PUBLICATIONS

International Search Report for International Patent Application No. PCT/CN2022/080914 issued by the International Patent Office on Jun. 6, 2022 and its English translation provided by WIPO.
(Continued)

*Primary Examiner* — David S Huang
(74) *Attorney, Agent, or Firm* — Ladas & Parry, LLP

(57) ABSTRACT
A beam signal transmission method, a beam signal transmission apparatus, a network-side node and a terminal are provided. The method includes: obtaining mode information about a plurality of sending beams of a first network-side node; sending transmission signals sequentially through each beam in a time division manner in one sending period according to the plurality of beams indicated by the mode information.

20 Claims, 12 Drawing Sheets

(56) References Cited

U.S. PATENT DOCUMENTS

| | | | |
|---|---|---|---|
| 2020/0022068 A1 | 1/2020 | Ly et al. | |
| 2020/0221408 A1 | 7/2020 | Lee et al. | |
| 2021/0127354 A1* | 4/2021 | Rune | H04W 56/001 |
| 2021/0195603 A1 | 6/2021 | Jiang et al. | |
| 2021/0297870 A1* | 9/2021 | Luo | H04B 7/145 |
| 2021/0391897 A1* | 12/2021 | Wang | H04B 7/024 |
| 2022/0322105 A1 | 10/2022 | Ren et al. | |
| 2022/0345908 A1* | 10/2022 | Takano | H04B 7/0639 |

FOREIGN PATENT DOCUMENTS

| | | |
|---|---|---|
| CN | 110300444 A | 10/2019 |
| CN | 110891313 A | 3/2020 |
| CN | 111954147 A | 11/2020 |

OTHER PUBLICATIONS

Written Opinion for International Patent Application No. PCT/CN2022/080914 issued by the International Patent Office on Jun. 6, 2022 and its English translation provided by WIPO.

International Preliminary Report on Patentability for International Patent Application No. PCT/CN2022/080914 issued by the International Patent Office on Oct. 3, 2023 and its English translation provided by WIPO.

Extended European Search Report issued on Aug. 19, 2024 for European Patent Application No. 22778552.4.

Office action and search report from corresponding Chinese Patent Application No. 202110363872.4 dated Mar. 31, 2025 with search report.

NTT Docomo, Inc., RP-170376, "Status Report of Study on New Radio Access Technology," 3GPP TSG RAN meeting #75, Dubrovnik, Croatia, Mar. 6-9, 2017, Feb. 28, 2017.

NTT Docomo, R1-1703622, 3GPP TR 38.802 (Feb. 2017), "Study on New Radio (NR) Access Technology; Physical Layer Aspects," 3GPP tsg_ran\WG1_RL1,TSGR1_88, Feb. 15, 2017, France.

* cited by examiner

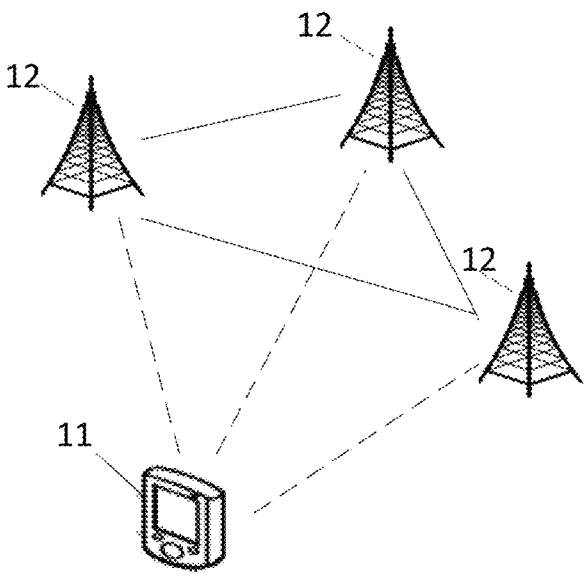
FIG. 1
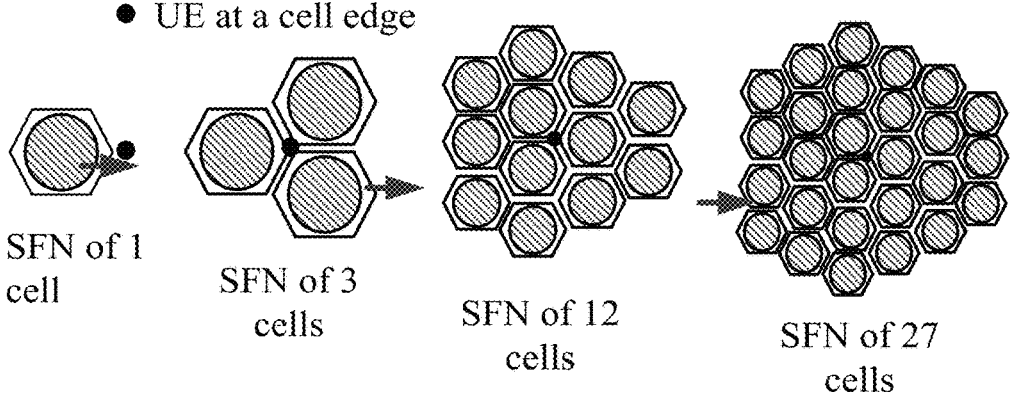
FIG. 2
| | S310 |
|---|---|
| Obtaining mode information about a plurality of sending beams of a first network-side node | |
↓
| | S320 |
|---|---|
| According to the plurality of beams indicated by the mode information, sending transmission signals sequentially through each beam in a time division manner in one transmission period | |
FIG. 3

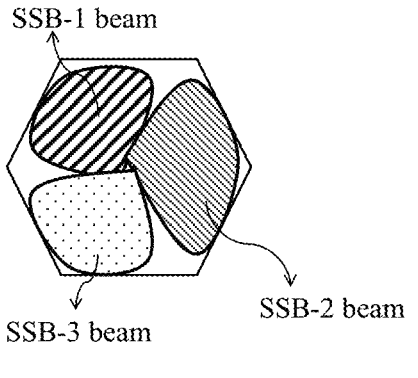
SSB-1 beam
SSB-3 beam
SSB-2 beam
SSB-1 beam: direction is 120 degrees,
width is 120 degrees;
SSB-2 beam: direction is 0 degree,
width is 120 degrees;
SSB-3 beam: direction is 240 degrees,
width is 120 degrees;
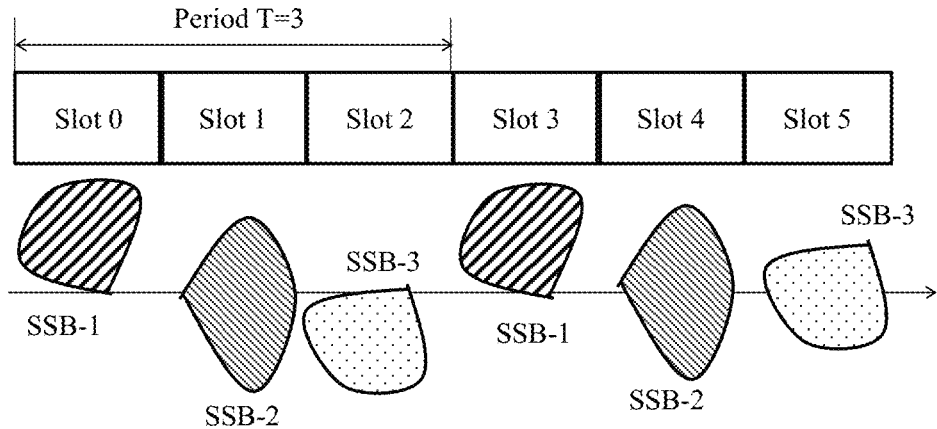
FIG. 6
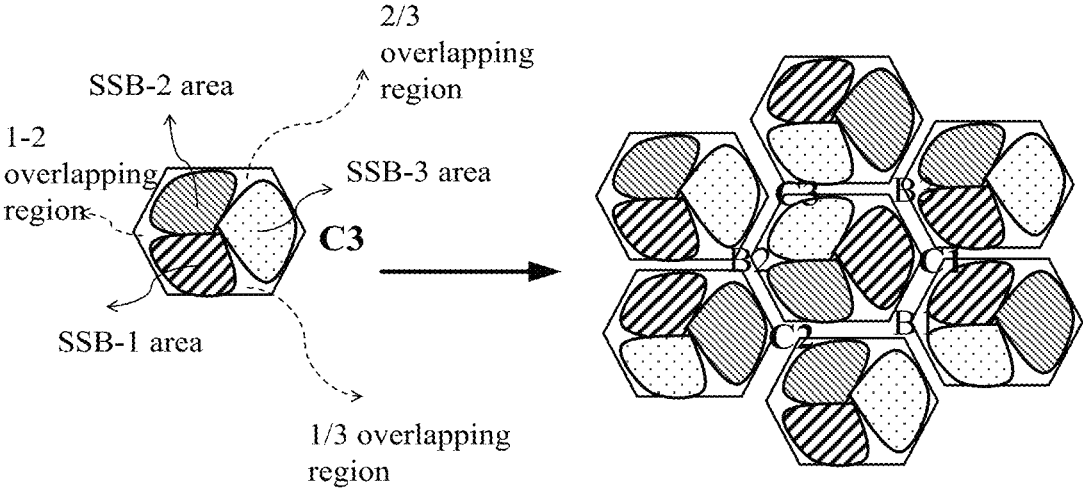
FIG. 7

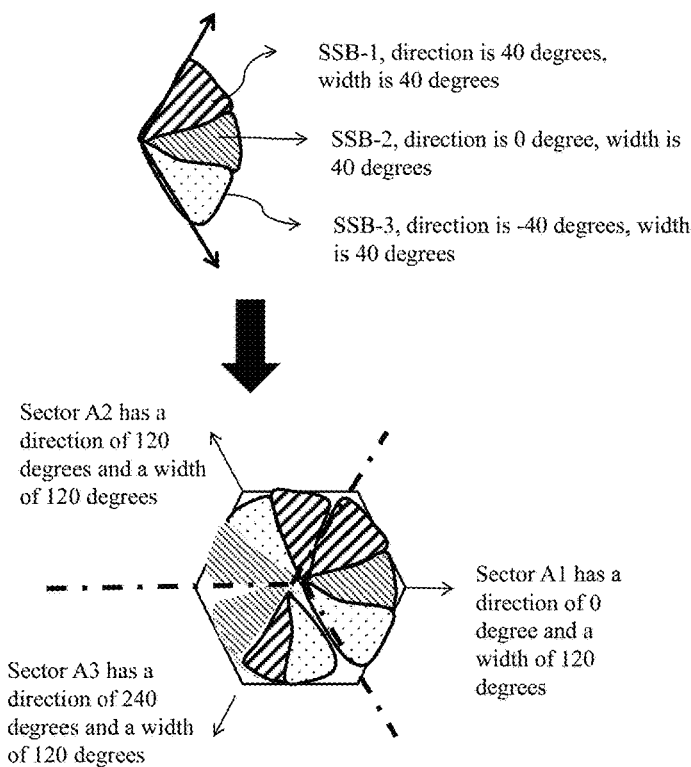

SSB-1, direction is 40 degrees, width is 40 degrees

SSB-2, direction is 0 degree, width is 40 degrees

SSB-3, direction is -40 degrees, width is 40 degrees

Sector A2 has a direction of 120 degrees and a width of 120 degrees

Sector A1 has a direction of 0 degree and a width of 120 degrees

Sector A3 has a direction of 240 degrees and a width of 120 degrees

FIG. 14

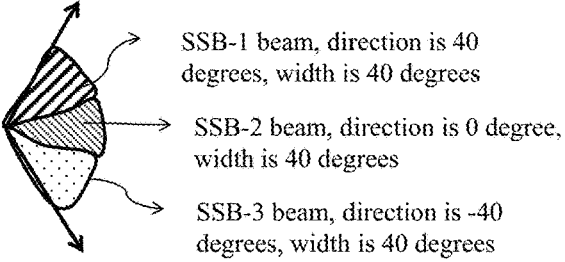

SSB-1 beam, direction is 40 degrees, width is 40 degrees

SSB-2 beam, direction is 0 degree, width is 40 degrees

SSB-3 beam, direction is -40 degrees, width is 40 degrees

Sector cell ID=1 （width is 120 degrees）

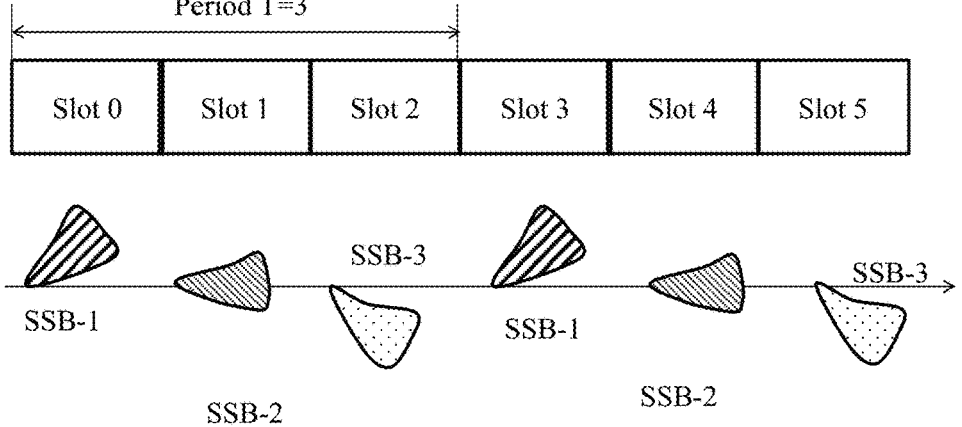

FIG. 15

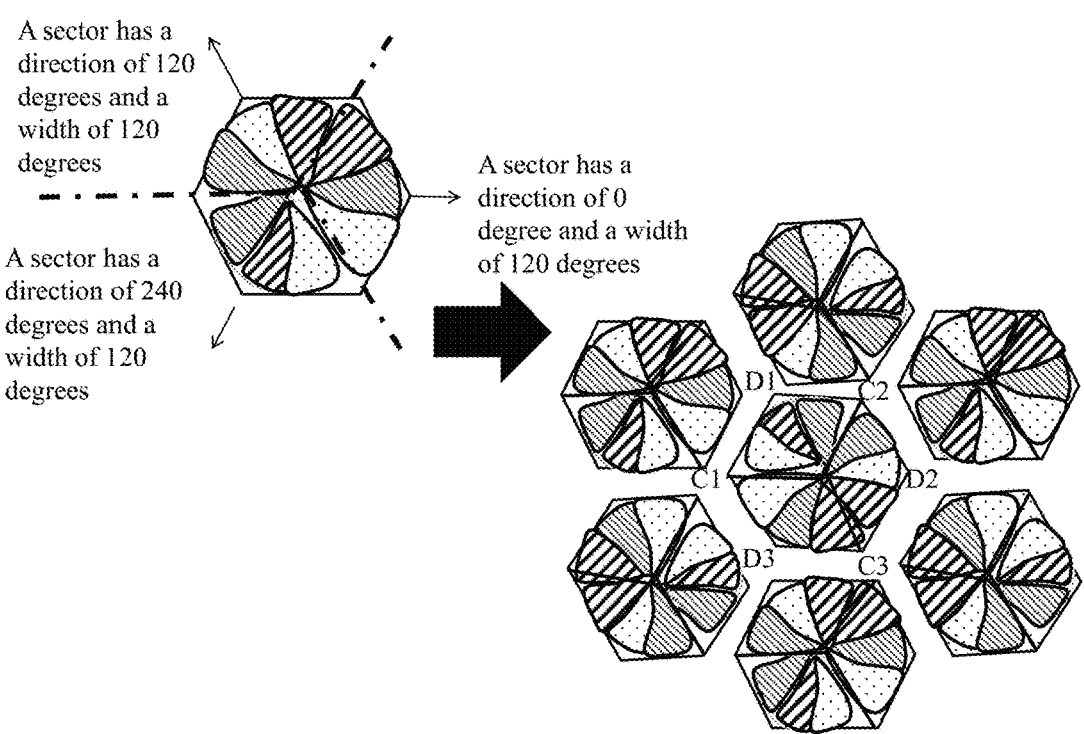

A sector has a direction of 120 degrees and a width of 120 degrees

A sector has a direction of 240 degrees and a width of 120 degrees

A sector has a direction of 0 degree and a width of 120 degrees

FIG. 16

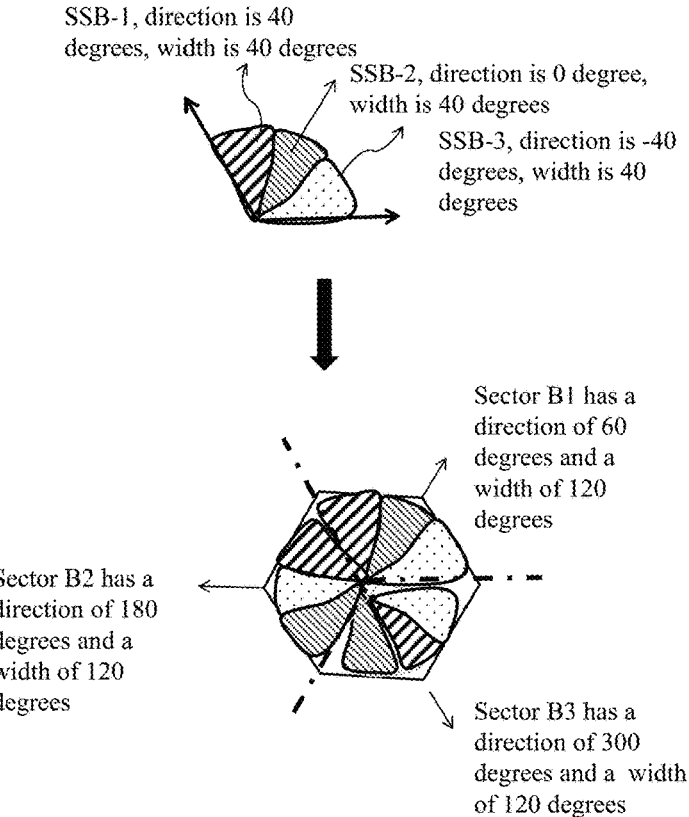

SSB-1, direction is 40 degrees, width is 40 degrees

SSB-2, direction is 0 degree, width is 40 degrees

SSB-3, direction is -40 degrees, width is 40 degrees

Sector B1 has a direction of 60 degrees and a width of 120 degrees

Sector B2 has a direction of 180 degrees and a width of 120 degrees

Sector B3 has a direction of 300 degrees and a width of 120 degrees

FIG. 17

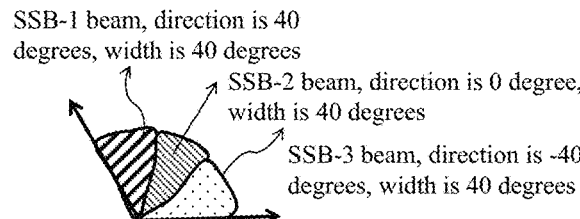
SSB-1 beam, direction is 40 degrees, width is 40 degrees
SSB-2 beam, direction is 0 degree, width is 40 degrees
SSB-3 beam, direction is -40 degrees, width is 40 degrees
Sector cell ID=1 (width is 120 degrees), sector type B
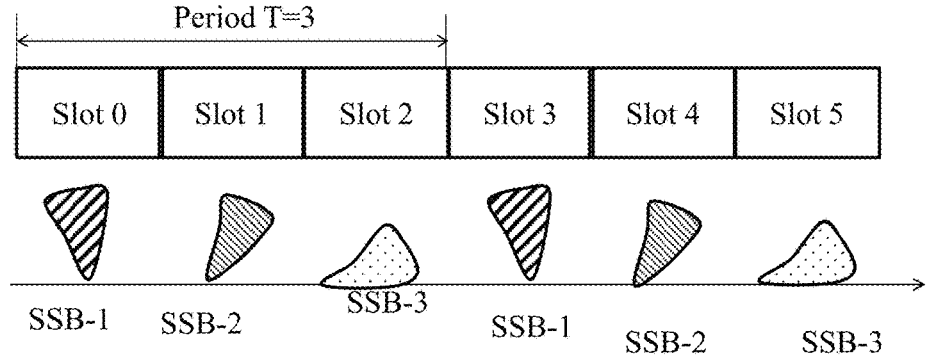
FIG. 18
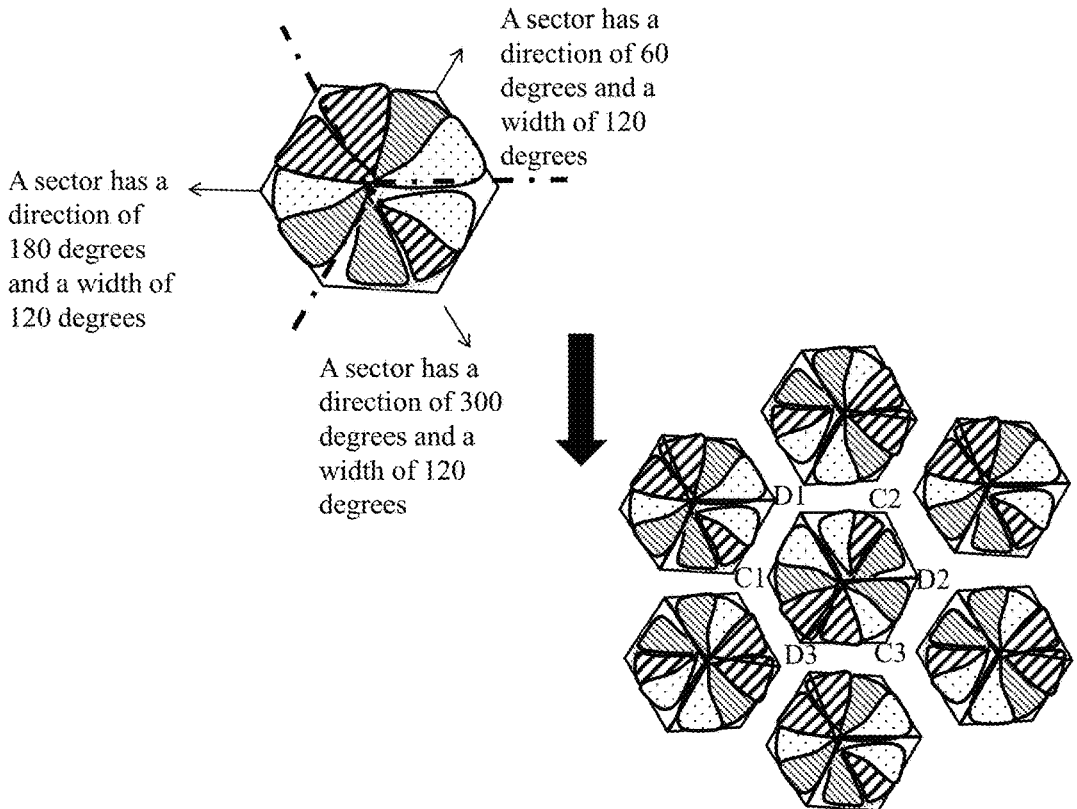
A sector has a direction of 60 degrees and a width of 120 degrees
A sector has a direction of 180 degrees and a width of 120 degrees
A sector has a direction of 300 degrees and a width of 120 degrees
FIG. 19

BEAM SIGNAL TRANSMISSION METHOD AND APPARATUS, AND NETWORK SIDE NODE AND TERMINAL

CROSS-REFERENCE TO RELATED APPLICATIONS

This application is a U.S. national phase application of a PCT Application No. PCT/CN2022/080914 filed on Mar. 15, 2022, which claims a priority to Chinese Patent Application No. 202110363872.4, filed on Apr. 2, 2021, the disclosures of which are incorporated in their entireties by reference herein.

TECHNICAL FIELD

The present disclosure relates to the field of wireless technologies, and in particular, to a beam signal transmission method, a beam signal transmission apparatus, a network-side node, and a terminal.

BACKGROUND

At present, in order to improve receiving performance of a user, a fifth generation (5G) mobile communication technology can be deployed on a higher frequency spectrum (for example, at 3.5 GHz and 5.9 GHz), usually using beamforming technology. When sending a system broadcast message or a paging message, a beamforming technology of a synchronization signal block (SSB) is also used, that is, a coverage area of a cell is divided into a plurality of beam coverage areas, and a base station sends, at each beam coverage area, a synchronization signal block (SSB) which is used by a terminal as data information for cell search and initial access, the beam coverage area may be referred to as an SSB beam coverage area, or an SSB beam.

In addition, in current broadcast/multicast service transmission, a single frequency network (SFN) technology is usually used to increase a signal power of a user equipment (UE) at a cell edge and improve a frequency spectrum utilization rate of the cell edge, so as to improve user satisfaction; the SFN technology is that adjacent cells/base stations send the same signal, and when the same signal sent by different cells reaches the UE at the cell edge, a power of the received signal is superposition of powers of the signal of various cells. In a traditional non-SFN technology, signals from other cells are interference, which makes the SFN technology is more advantageous for transmission of a broadcast signal, thereby greatly improving receiving performance of the UE at the cell edge.

However, a spectrum frequency in the fourth generation (4G) mobile communication of the related technology is relatively low, for example, the spectrum frequency is generally lower than 2 GHz, and a frequency for new radio (NR) deployment is relatively high, for example, can reach 3.5 GHz or 5.9 GHz in a low frequency band in the related art; and as compared with 2 GHz, the 3.5 GHz will have a 2.4 dB loss. Therefore, it is possible that the SFN technology at a cell level in the related art cannot meet coverage requirements of NR network deployment for the UE at the cell edge.

SUMMARY

Embodiments of the present disclosure provide a beam signal transmission method and a beam signal transmission apparatus, a network-side node, and a terminal, which solve the problem that a power loss at a cell edge by using the SFN technology cannot meet coverage requirement of a network deployment for a cell edge UE.

A beam signal transmission method performed by a first network-side node is provided. The method includes:

obtaining mode information about a plurality of sending beams of the first network-side node;

sending transmission signals sequentially through each beam in a time division manner in one sending period according to the plurality of beams indicated by the mode information.

Optionally, the mode information includes at least one of following:

identification information of the first network-side node;

a quantity of beams to be sent within a sending period;

a beam direction of each beam;

a beam width of each beam;

a sending duration of each beam;

a mode type of the mode information;

periodic information of the sending period;

a period offset value of sending each beam;

a sending sequence of the plurality of beams within a sending period.

Optionally, the mode information is obtained by at least one of following manners:

configuring by a Multicast/Broadcast Service (MBS) control entity, an operation and maintenance platform, or one of a plurality of adjacent network-side nodes;

determining by negotiation between at least two network-side nodes in a plurality of adjacent network-side nodes within a preset range, wherein the first network-side node belongs to one of the plurality of adjacent network-side nodes.

Optionally, the mode information includes one mode type, and the mode type indicates a sending sequence of the plurality of beams, a quantity of sending beams to be sent in one sending period, a beam direction of each beam, a width of each beam, and a sending duration of each beam;

sending the transmission signals sequentially through each beam in the time division manner in one sending period according to the plurality of beams indicated by the mode information includes:

sending the transmission signals sequentially through each beam in the time division manner in one sending period, according to the sending sequence of the plurality of beams, the quantity of beams to be sent, the beam direction of each beam, the width of each beam and the sending duration of each beam corresponding to the mode type.

Optionally, the mode information includes at least two mode types, and the at least two mode types are different in at least one of the sending sequence of the sending beams, the quantity of sending beams to be sent in one sending period, the beam direction of each beam, the width of each beam, and the sending duration of each beam corresponding to the at least two mode types;

sending the transmission signals sequentially through each beam in the time division manner in one sending period according to the plurality of beams indicated by the mode information includes:

sending the transmission signals sequentially through the plurality of beams indicated by each mode type in one sending period in the time division manner and in a preset sequence of the at least two mode types.

Optionally, the transmission signals sent by the plurality of beams indicated by a same mode type are same, or are same information repeatedly sent; the transmission signals sent by the plurality of beams indicated by different mode types are different.

Optionally, a beam type of each sending beam of the first network-side node is same as a beam type of a sending beam of at least one adjacent second network-side node at a corresponding time instant, and the transmission signals being sent are same.

Optionally, the transmission signals include at least one of a synchronization signal and system information.

Optionally, the beam signal transmission method further includes sending at least one of following information to the terminal:

beam information of beams indicated by different mode types;

a plurality of pieces of beam pair information, wherein each piece of beam pair information includes beam information of at least two beams, at least two beams in same beam pair information belong to different mode types, respectively, and in one sending period, at least two beams of a same beam pair are respectively sent at different time instants and cover a same area of a signal coverage range.

Optionally, a signal coverage range of the first network-side node is a full-angle coverage range, or a preset-angle coverage range.

A beam signal transmission method performed by a terminal is provided. The method includes:

obtaining mode information about a plurality of sending beams of a first network-side node; and measuring transmission signals on a plurality of beams according to the plurality of beams indicated by the mode information.

Optionally, the mode information includes at least one of following:

identification information of the first network-side node;

a quantity of beams to be sent in a sending period;

a beam direction of each beam;

a beam width of each beam;

a sending duration of each beam;

a mode type of the mode information;

periodic information of the sending period;

a period offset value of sending each beam;

a sending sequence of the plurality of beams within a sending period.

Optionally, the mode information includes one mode type, and the mode type indicates a sending sequence of the plurality of beams, a quantity of sending beams to be sent in one sending period, a beam direction of each beam, a width of each beam, and a sending duration of each beam.

Optionally, the mode information includes at least two mode types, and the at least two mode types are different in at least one of the sending sequence of the sending beams, the quantity of sending beams to be sent in one sending period, the beam direction of each beam, the width of each beam, and the sending duration of each beam corresponding to the at least two mode types.

Optionally, the beam signal transmission method further includes: obtaining at least one of following information sent by the first network-side node to the terminal:

beam information of beams indicated by different mode types;

a plurality of pieces of beam pair information, wherein each piece of beam pair information includes beam information of at least two beams, at least two beams in same beam pair information belong to different mode types, respectively, and in one sending period, at least two beams of a same beam pair are respectively sent at different time instants and cover a same area of a signal coverage range.

Optionally, measuring the transmission signals on the plurality of beams according to the plurality of beams indicated by the mode information includes:

measuring a plurality of reception beams according to beam information of the beams indicated by the different mode types, to obtain measurement results;

selecting at least one beam from the beams of different mode types to receive the transmission signals, according to the measurement results.

Optionally, measuring the transmission signals on the plurality of beams according to the plurality of beams indicated by the mode information includes:

measuring each beam in target beam pair information in a plurality of pieces of beam pair information, to obtain a transmission signal on each measured beam;

wherein an area where the terminal is located is within a coverage range of beams included in the target beam pair information.

Optionally, the transmission signals include at least one of a synchronization signal and system information.

A network-side node is provided, the network-side node is a first network-side node which includes: a memory, a transceiver, and a processor, wherein the memory is configured to store a computer program, the transceiver is configured to send and receive data under control of the processor, and the processor is configured to read the computer program in the memory and execute the following steps:

obtaining mode information about a plurality of sending beams of the first network-side node;

sending transmission signals sequentially through each beam in a time division manner in one sending period according to the plurality of beams indicated by the mode information.

Optionally, the mode information includes at least one of following:

identification information of the first network-side node;

a quantity of beams to be sent within a sending period;

a beam direction of each beam;

a beam width of each beam;

a sending duration of each beam;

a mode type of the mode information;

periodic information of the sending period;

a period offset value of sending each beam;

a sending sequence of the plurality of beams within a sending period.

Optionally, the mode information is obtained by the processor through at least one of following manners:

configuring by a Multicast/Broadcast Service (MBS) control entity, an operation and maintenance platform, or one of a plurality of adjacent network-side nodes;

determining by negotiation between at least two network-side nodes in a plurality of adjacent network-side nodes within a preset range, wherein the first network-side node belongs to one of the plurality of adjacent network-side nodes.

Optionally, the mode information includes one mode type, and the mode type indicates a sending sequence of the plurality of beams, a quantity of sending beams to be sent in one sending period, a beam direction of each beam, a width of each beam, and a sending duration of each beam;

sending the transmission signals sequentially through each beam in the time division manner in one sending period according to the plurality of beams indicated by the mode information includes:

sending the transmission signals sequentially through each beam in the time division manner in one sending period, according to the sending sequence of the plurality of beams, the quantity of beams to be sent, the beam direction of each beam, the width of each beam and the sending duration of each beam corresponding to the mode type.

Optionally, the mode information includes at least two mode types, and the at least two mode types are different in at least one of the sending sequence of the sending beams, the quantity of sending beams to be sent in one sending period, the beam direction of each beam, the width of each beam, and the sending duration of each beam corresponding to the at least two mode types;

sending the transmission signals sequentially through each beam in the time division manner in one sending period according to the plurality of beams indicated by the mode information includes:

sending the transmission signals sequentially through the plurality of beams indicated by each mode type in one sending period in the time division manner and in a preset sequence of the at least two mode types.

Optionally, the transmission signals sent by the plurality of beams indicated by a same mode type are same, or are same information repeatedly sent; the transmission signals sent by the plurality of beams indicated by different mode types are different.

Optionally, a beam type of each sending beam of the first network-side node is same as a beam type of a sending beam of at least one adjacent second network-side node at a corresponding time instant, and the transmission signals being sent are same.

Optionally, the transmission signals include at least one of a synchronization signal and system information.

Optionally, the processor is further configured to read the computer program in the memory and execute: sending at least one of following information to the terminal:

beam information of beams indicated by different mode types;

a plurality of pieces of beam pair information, wherein each piece of beam pair information includes beam information of at least two beams, at least two beams in same beam pair information belong to different mode types, respectively, and in one sending period, at least two beams of a same beam pair are respectively sent at different time instants and cover a same area of a signal coverage range.

Optionally, a signal coverage range of the first network-side node is a full-angle coverage range, or a preset-angle coverage range.

A terminal is provided. The terminal includes: a memory, a transceiver, and a processor, wherein the memory is configured to store a computer program, the transceiver is configured to send and receive data under control of the processor, and the processor is configured to read the computer program in the memory and execute the following steps:

obtaining mode information about a plurality of sending beams of a first network-side node; and measuring transmission signals on a plurality of beams according to the plurality of beams indicated by the mode information.

Optionally, the mode information includes at least one of following:

identification information of the first network-side node;

a quantity of beams to be sent in a sending period;

a beam direction of each beam;

a beam width of each beam;

a sending duration of each beam;

a mode type of the mode information;

periodic information of the sending period;

a period offset value of sending each beam;

a sending sequence of the plurality of beams within a sending period.

Optionally, the mode information includes one mode type, and the mode type indicates a sending sequence of the plurality of beams, a quantity of sending beams to be sent in one sending period, a beam direction of each beam, a width of each beam, and a sending duration of each beam.

Optionally, the mode information includes at least two mode types, and the at least two mode types are different in at least one of the sending sequence of the sending beams, the quantity of sending beams to be sent in one sending period, the beam direction of each beam, the width of each beam, and the sending duration of each beam corresponding to the at least two mode types.

Optionally, the processor is configured to read the computer program in the memory and further execute the following steps: obtaining at least one of following information sent by the first network-side node to the terminal:

beam information of beams indicated by different mode types;

a plurality of pieces of beam pair information, wherein each piece of beam pair information includes beam information of at least two beams, at least two beams in same beam pair information belong to different mode types, respectively, and in one sending period, at least two beams of a same beam pair are respectively sent at different time instants and cover a same area of a signal coverage range.

Optionally, measuring the transmission signals on the plurality of beams according to the plurality of beams indicated by the mode information includes:

measuring a plurality of reception beams according to beam information of the beams indicated by the different mode types, to obtain measurement results;

selecting at least one beam from the beams of different mode types to receive the transmission signals, according to the measurement results.

Optionally, measuring the transmission signals on the plurality of beams according to the plurality of beams indicated by the mode information includes:

measuring each beam in target beam pair information in a plurality of pieces of beam pair information, to obtain a transmission signal on each measured beam;

wherein an area where the terminal is located is within a coverage range of beams included in the target beam pair information.

Optionally, the transmission signals include at least one of a synchronization signal and system information.

A beam signal transmission apparatus applied to a first network-side node is provided. The apparatus includes:

a first information obtaining unit, configured to obtain mode information about a plurality of sending beams of the first network-side nod; and a transmission unit, configured to send transmission signals sequentially through each beam in a time division manner in one sending period according to the plurality of beams indicated by the mode information.

Optionally, in beam signal transmission apparatus, the mode information includes at least one of following:

identification information of the first network-side node;

a quantity of beams to be sent within a sending period;

a beam direction of each beam;

a beam width of each beam;

a sending duration of each beam;

a mode type of the mode information;

periodic information of the sending period;

a period offset value of sending each beam;

a sending sequence of the plurality of beams within a sending period.

Optionally, in the beam signal transmission apparatus, the mode information is obtained by the first information obtaining unit through at least one of following manners:

configuring by a Multicast/Broadcast Service (MBS) control entity, an operation and maintenance platform, or one of a plurality of adjacent network-side nodes;

determining by negotiation between at least two network-side nodes in a plurality of adjacent network-side nodes within a preset range, wherein the first network-side node belongs to one of the plurality of adjacent network-side nodes.

Optionally, in the beam signal transmission apparatus, the mode information includes one mode type, and the mode type indicates a sending sequence of the plurality of beams, a quantity of sending beams to be sent in one sending period, a beam direction of each beam, a width of each beam, and a sending duration of each beam;

sending the transmission signals sequentially through each beam in the time division manner in one sending period according to the plurality of beams indicated by the mode information includes:

sending the transmission signals sequentially through each beam in the time division manner in one sending period, according to the sending sequence of the plurality of beams, the quantity of beams to be sent, the beam direction of each beam, the width of each beam and the sending duration of each beam corresponding to the mode type.

Optionally, in the beam signal transmission apparatus, the mode information includes at least two mode types, and the at least two mode types are different in at least one of the sending sequence of the sending beams, the quantity of sending beams to be sent in one sending period, the beam direction of each beam, the width of each beam, and the sending duration of each beam corresponding to the at least two mode types;

sending the transmission signals sequentially through each beam in the time division manner in one sending period according to the plurality of beams indicated by the mode information includes:

sending the transmission signals sequentially through the plurality of beams indicated by each mode type in one sending period in the time division manner and in a preset sequence of the at least two mode types.

Optionally, in the beam signal transmission apparatus, the transmission signals sent by the plurality of beams indicated by a same mode type are same, or are same information repeatedly sent; the transmission signals sent by the plurality of beams indicated by different mode types are different.

Optionally, in in the beam signal transmission apparatus, a beam type of each sending beam of the first network-side node is same as a beam type of a sending beam of at least one adjacent second network-side node at a corresponding time instant, and the transmission signals being sent are same.

Optionally, in the beam signal transmission apparatus, the transmission signals include at least one of a synchronization signal and system information.

Optionally, the beam signal transmission apparatus further includes a sending unit, configured to send at least one of following information to the terminal:

beam information of beams indicated by different mode types;

a plurality of pieces of beam pair information, wherein each piece of beam pair information includes beam information of at least two beams, at least two beams in same beam pair information belong to different mode types, respectively, and in one sending period, at least two beams of a same beam pair are respectively sent at different time instants and cover a same area of a signal coverage range.

Optionally, in the beam signal transmission apparatus, a signal coverage range of the first network-side node is a full-angle coverage range, or a preset-angle coverage range.

A beam signal transmission apparatus applied to a terminal is provided The apparatus includes:

a second information obtaining unit, configured to obtain mode information about a plurality of sending beams of a first network-side node; and a measurement unit, configured to measure transmission signals on a plurality of beams according to the plurality of beams indicated by the mode information.

Optionally, in beam signal transmission apparatus, the mode information includes at least one of following:

identification information of the first network-side node;

a quantity of beams to be sent in a sending period;

a beam direction of each beam;

a beam width of each beam;

a sending duration of each beam;

a mode type of the mode information;

periodic information of the sending period;

a period offset value of sending each beam;

a sending sequence of the plurality of beams within a sending period.

Optionally, in beam signal transmission apparatus, the mode information includes one mode type, and the mode type indicates a sending sequence of the plurality of beams, a quantity of sending beams to be sent in one sending period, a beam direction of each beam, a width of each beam, and a sending duration of each beam.

Optionally, in beam signal transmission apparatus, the mode information includes at least two mode types, and the at least two mode types are different in at least one of the sending sequence of the sending beams, the quantity of sending beams to be sent in one sending period, the beam direction of each beam, the width of each beam, and the sending duration of each beam corresponding to the at least two mode types.

Optionally, in beam signal transmission apparatus, the second signal obtaining unit is further configured to obtain at least one of following information sent by the first network-side node to the terminal:

beam information of beams indicated by different mode types;

a plurality of pieces of beam pair information, wherein each piece of beam pair information includes beam information of at least two beams, at least two beams in same beam pair information belong to different mode types, respectively, and in one sending period, at least two beams of a same beam pair are respectively sent at different time instants and cover a same area of a signal coverage range.

Optionally, in beam signal transmission apparatus, measuring the transmission signals on the plurality of beams according to the plurality of beams indicated by the mode information includes:

measuring a plurality of reception beams according to beam information of the beams indicated by the different mode types, to obtain measurement results;

selecting at least one beam from the beams of different mode types to receive the transmission signals, according to the measurement results.

Optionally, in beam signal transmission apparatus, measuring the transmission signals on the plurality of beams according to the plurality of beams indicated by the mode information includes:

measuring each beam in target beam pair information in a plurality of pieces of beam pair information, to obtain a transmission signal on each measured beam;

wherein an area where the terminal is located is within a coverage range of beams included in the target beam pair information.

Optionally, in beam signal transmission apparatus, the transmission signals include at least one of a synchronization signal and system information.

A processor-readable storage medium, wherein the processor-readable storage medium stores a computer program, and the computer program is configured to cause a processor to execute the beam signal transmission method according to any one described above.

The beam signal transmission methods according to the embodiments of the present disclosure have at least the following beneficial effects:

according to the beam signal transmission method in this embodiment, the first network-side node is any network-side node of a plurality of adjacent network-side nodes, and the transmission signals can be sequentially sent through the beams according to the mode information by obtaining the mode information about sending beams. On this basis, coordination and synchronization of sending the transmission signals by the plurality of network-side nodes are ensured, and the received signals of the terminal located at the cell edge of the cell are superposed to obtain the gain generated by using the SFN technology, so as to meet the requirement of the NR network deployment for covering a terminal at a cell edge.

BRIEF DESCRIPTION OF THE DRAWINGS

In order to more clearly illustrate the technical solutions in the embodiments of the present disclosure or related art, the accompanying drawings that need to be used in description of the embodiments or the related art are briefly described below, and it is obvious that the accompanying drawings in the following description are merely some embodiments in the present disclosure, and other drawings may be obtained by a person of ordinary skill in the art according to these drawings without paying creative labor.

FIG. 1 is a structural diagram of a network system applicable to embodiments of the present disclosure;

FIG. 2 shows a schematic diagram of a principle of using a cell-level SFN technology;

FIG. 3 is a schematic flowchart of a beam signal transmission method according to an embodiment of the present disclosure;

FIG. 5 to FIG. 7 illustrate schematic diagrams of a mode structure of a beam signal in Embodiment 1;

FIG. 11 to FIG. 14 illustrate schematic diagrams of a mode structure of a beam signal in Embodiment 3;

FIG. 15 to FIG. 16 illustrate schematic diagrams of a mode structure of a beam signal in Embodiment 4;

FIG. 17 to FIG. 19 illustrate a schematic diagram of a mode structure of a beam signal in Embodiment 5;

DETAILED DESCRIPTION

Figure 4:
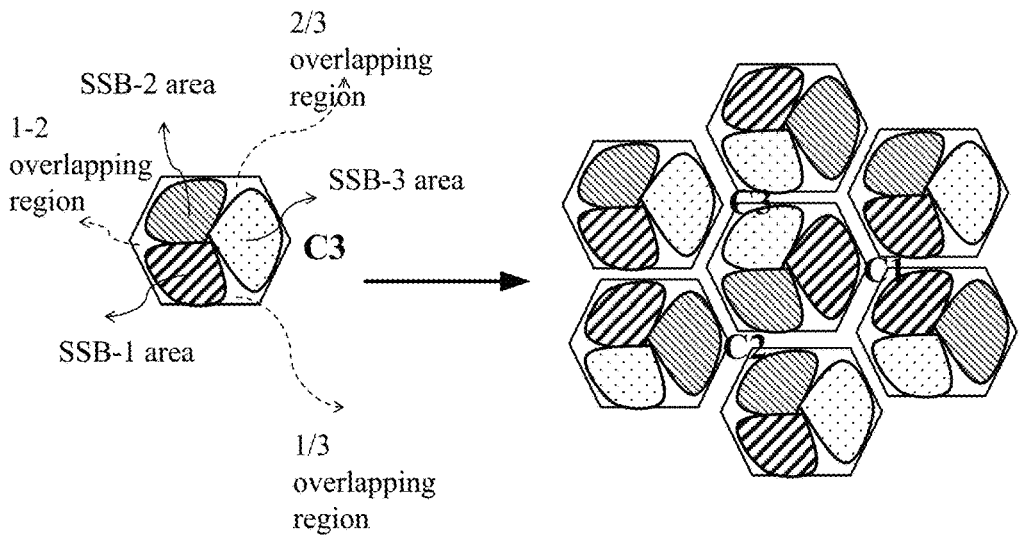
FIG. 4 is a schematic diagram of an SFN technology based on a beam signal.

The technical solutions in the embodiments of the present disclosure will be clearly and completely described below with reference to the accompanying drawings in the embodiments of the present disclosure. Obviously, the described embodiments are only part, rather than all, of the embodiments of the present disclosure. All other embodiments obtained by a person of ordinary skill in the art based on the embodiments of the present disclosure without creative efforts shall fall within the protection scope of the present disclosure.

The terms "first", "second", and the like in the specification and claims of the present disclosure are used to distinguish similar objects, and do not need to be used to describe a specific order or sequence. It should be understood that terms used in this way may be interchanged under appropriate circumstances so that the embodiments of the present disclosure are described herein, for example, are implemented in an order other than those illustrated or described herein. Furthermore, the terms "include" and "have" and any variations thereof are intended to cover non-exclusive inclusion, for example, processes, methods, systems, products, or devices that include a series of steps or units are not necessarily limited to those steps or units clearly listed, but may include other steps or units not expressly listed or inherent to these processes, methods, products, or devices.

In the embodiments of the present disclosure, the term "and/or" describes an association relationship of associated objects, and indicates that there may be three relationships, for example, A and/or B may indicate three cases that A exists alone, A and B exist at the same time, and B exists alone. The character "/" generally indicates that the associated objects have a "or" relationship. In the embodiments of the present disclosure, the term "a plurality of" means two or more, and other quantifiers are similar to the term.

In the embodiments of the present disclosure, words such as "exemplary" or "for example" are used to represent an example, an illustration, or a description. Any embodiment or design scheme described as "exemplary" or "for example" in the embodiments of the present disclosure should not be construed as being more preferred or more advantageous than other embodiments or design schemes. Rather, use of "exemplary" or "e.g." is intended to present related concepts in a particular manner.

Embodiments of the present disclosure are described below with reference to the accompanying drawings. The beam signal transmission method and the beam signal transmission method apparatus, the network-side node, and the terminal provided in the embodiments of the present disclosure may be applied to a wireless communication system. Optionally, the beam signal transmission method in the embodiments of the present disclosure may be applicable to various systems, especially 5G systems. For example, the applicable system may be a Global System of Mobile Communication (GSM) system, a Code Division Multiple Access (CDMA) system, a Wideband Code Division Multiple Access system (WCDMA) system, a General Packet Radio Service (GPRS) system, a Long Term Evolution (LTE) system, a LTE Frequency Division Duplex (FDD) system, a LTE Time Division Duplex (TDD) system, a Long Term Evolution Advanced (LTE-A) system, A Universal Mobile Telecommunication System (UMTS), a Worldwide Interoperability for Microwave Access (WiMAX) system, a 5G New Radio (NR) system, etc. Each system includes a terminal device and a network device. The system may further include a core network portion, such as an Evolved Packet System (EPS), a 5G system (5 GS), etc.

FIG. 1 is a schematic structural diagram of a network system to which a beam signal transmission method according to an embodiment of the present disclosure is applicable. The system includes a terminal 11 and a plurality of network-side nodes 12, where the terminal 11 may be a user equipment (UE), for example, may be a terminal-side device, such as a mobile phone, a tablet personal computer, a laptop computer, a personal digital assistant (PDA), a mobile Internet device (MID) or a wearable device, and the like. It should be noted that a specific type of the terminal 11 is not limited in the embodiments of the present disclosure. The network-side node 12 may be a 5G and a later-version base station (for example, a gNB, a 5G NR NB), or a base station in other communication systems, or referred to as a node B, and it should be noted that in this embodiment of the present disclosure, only a 5G base station is used as an example, but the specific type of the base station is not limited.

In a 5G new radio (NR) technology, in order to improve receiving performance (such as improve the receiving performance to be 3 times of 4G performance) of a user, a 5G technology can be deployed on a higher spectrum (for example, at 3.5 GHz, 5.9 GHz), and beamforming technology is used. When sending a system broadcast message/a paging message, an SSB beamforming technology is also used, that is, a coverage area of a cell is divided into a plurality of beam coverage areas, that is, a network-side node (i.e., a base station) sends an SSB (Synchronization Signal Block which is used by a terminal as data information for cell search and initial access) at each beam coverage area.

In addition, in order to increase a signal power of a terminal at the cell edge, a single frequency network technology, that is, an SFN technology, is usually used to improve a frequency spectrum utilization rate at the cell edge, thereby improving the user satisfaction. The SFN technology is that the adjacent cells/base stations send the same signals, and when the same signals sent by different cells reach the UE at the cell edge, the power of the received signal is the superposition of powers of the signals of various cell.

For example, as shown in FIG. 2, a technical gain of a cell-level SFN is used, and when the number of cells participating in the SFN is 1, this is equivalent to no SFN technology being used and it is assumed that the power of the signal received by the terminal or the UE at the edge cell is 1 in this case. When the number of cells participating in the SFN is 3, the power of the received signal is 3; when the number of cells participating in the SFN is 12, the power of the received signal is 4.42; and when the number of cells participating in the SFN is 27, the power of the received signal is 4.94. Therefore, it can be seen that the power of the received signal of the terminal at the cell edge is improved by means of the superposition of the signals of various cells by using the SFN technology.

However, for a case where a frequency of NR deployment is relatively high, compared with a lower spectral frequency of 4G deployment, there is a power loss, and even if a cell-level SFN technology is used, it is also possible that requirement of the NR network deployment for covering a terminal at the cell edge cannot be met.

Based on the above-mentioned problems, the embodiments of the present disclosure provide a beam signal transmission method, which uses network-side nodes for coordination, to determine mode information of sending a beam signal, so as to ensure coordination and synchronization of sending beam signals among the network-side nodes, and ensure the gain generated by using the SFN technology to meet the requirement of the NR network deployment for covering the terminal at the cell edge.

The beam signal transmission method according to one embodiment of the present disclosure is executed by a first network-side node, as shown in FIG. 3. The method includes:

S310: obtaining mode information about a plurality of sending beams of the first network-side node;

S320: according to the plurality of beams indicated by the mode information, sending transmission signals sequentially through each beam in a time division manner within one transmission period.

According to the beam signal transmission method in this embodiment, the first network-side node is any network-side node of a plurality of adjacent network-side nodes, and by obtaining the mode information about sending, the transmission signals can be sequentially sent through each beam according to the mode information. On this basis, coordination and synchronization of sending the transmission signals by the plurality of network-side nodes are ensured, and the received signals of the terminal located at the cell edge of the cell are superposed to obtain the gain generated by using the SFN technology, so as to meet the requirement of the NR network deployment for covering a terminal at a cell edge.

Optionally, the beam signal transmission method according to an embodiment of the present disclosure obtains the mode information by at least one of following manners:

configuring by a Multicast/Broadcast Service (MBS) control entity, an operation and maintenance platform, or one of a plurality of adjacent network-side nodes;

determining by negotiation between at least two network-side nodes in a plurality of adjacent network-side nodes within a preset range, where the first network-side node belongs to one of the plurality of adjacent network-side nodes.

In one embodiment, a method of determining the mode information of the sending beams may be centralized coordination, and configured through the MBS control entity, the operation and maintenance platform, or one of the plurality of adjacent network-side nodes. Optionally, the one of the network-side node may be the first network-side node. Specifically, by means of the centralized coordination, the mode information about sending beams of each network-side node in the plurality of network-side nodes may be configured and determined; in another embodiment, the method of determining the mode information of sending beams may be distributed negotiation, and is determined by negotiation between at least two network-side nodes in a plurality of adjacent network-side nodes within a preset range, and optionally, the first network-side node may be one of the network-side nodes for negotiating the mode information. Specifically, the mode information of sending beams of each of the plurality of network-side nodes may be determined by means of distributed negotiation. Optionally, the plurality of network-side nodes participating in negotiation may negotiate the mode information with each other through an interface between the network-side nodes.

According to the beam signal transmission method of the embodiments of the present disclosure, in one embodiment, optionally, the mode information includes at least one of following information:

identification information of the first network-side node;
   the number of beams that need to be transmitted within a sending period;
   a beam direction of each beam;
   a beam width of each beam;
   a sending duration of each beam;
   a mode type of the mode information;
   periodic information of the transmission period;
   a period offset value of sending each beam;
   a sending sequence of the plurality of beams within a sending period.

Specifically, according to the at least one piece of information included in the mode information, indicated transmission modes of the plurality of beam signals are determined; and according to the determined transmission modes, the transmission signals are sequentially sent through each beam in a time division mode in one transmission period.

Optionally, the transmission signals include at least one of a synchronization signal and system information.

The synchronization signal is a tracking signal for time and/or frequency synchronization, and the system information is control data and service data for a broadcast service.

The beam signal transmission method according to the embodiments of the present disclosure is formed as an SFN technology based on a beam signal, and is different from an omnidirectional signal SFN of a cell level, and the principle of the SFN technology based on the beam signal is:

in first specific time, the network-side node sends a signal with a beam in a first specific direction, and the beam signals of various network-side nodes are superimposed with each other to cover a first specific area;
   in second specific time, the network-side node sends a signal with a beam in a second specific direction, and the beam signals of various network-side nodes are superimposed with each other to cover a second specific area.

For example, for example, a cell is divided into three beam coverages, and a schematic diagram of 7 cells included in an SFN area is shown in FIG. 4, wherein each cell includes three SSB beams.

As shown in FIG. 4, when one cell is covered by three SSB area beams, covered areas may be an SSB-1 area, an SSB-2 area, and an SSB-3 area, respectively. Colorless blank portions in the cell represent overlapping coverage areas of different SSB areas. In addition, when the SFN region is composed of 7 cells, as shown in FIG. 4, the entirety of the SFN area is composed of three different types of SSB beam coverage.

A signal power from an average direction of a relative omnidirectional antenna to the cell edge (such as a C3 point in FIG. 4) is 1 in case of a single cell, and the signal power is 3 in the case of SSB beam coverage.

For the SFN technology including seven cells, it is assumed that the beam mode of each cell/base station, i.e., the mode information, is shown in Table 1 below:

TABLE 1

| Time | Slot 0 (t0-t1) | Slot 1 (t1-t2) | Slot 1 (t2-t3) |
|---|---|---|---|
| Transmission beam of a cell/a base station in an SFN area | SSB-1 | SSB-2 | SSB-3 | at time instances t0-t1, a beam signal sent by the base station/cell covers the SSB-1 area, then the power of a signal received by the terminal at the C1 point of the cell edge is 9 (the terminal receives signals transmitted from three SSB-1 beams, and each signal power is 3);

at time instances t1-t2, the beam signal sent by the base station/cell covers the SSB-2 area, then the power of the signal received by the terminal at the C2 point of the cell edge is 9 (the terminal receives signals transmitted from three SSB-2 beams, and each signal power is 3);

at time instances t2-t3, the beam signal sent by the base station/cell covers the SSB-3 area, then the power of the signal received by the terminal at the C3 point of the cell edge is 9 (the terminal receives signals transmitted from three SSB-2 beams, and each signal power is 3).

According to the above, the received signal powers of the UEs located at C1, C2 and C3 are about 9, the receiving power of the cell-level SFN is 4.42, and relative to the cell-level SFN, approximately 3.09 dB performance gain is obtained.

According to the above principle, the beam signal transmission method according to the embodiments of the present disclosure uses the SFN technology based on the beam signal to determine, by means of negotiation, the mode information of the sending beams of each network-side node, so that transmission signals are transmitted sequentially by means of each beam in the time division manner. Optionally, each beam covers a part of the area within a signal coverage region of a corresponding network-side node. In this way, compared with the cell-level SFN technology, the performance gain of signal reception of the terminal at the cell edge can be further improved, so as to meet the requirement of NR network deployment for covering the terminal at the cell edge.

In this embodiment of the present disclosure, optionally, the signal coverage range of the sending beams by the network-side node is a full-angle coverage range (also referred to as omnidirectional coverage), or a preset-angle coverage range (also referred to as directional coverage).

In addition, in this embodiment of the present disclosure, the concept of the beam is a concept perceived from a base station (that is, a network-side node in the present disclosure) perspective, the terminal perceives the strength of the reference signal (such as a measurement signal strength measured on the signal SSB or the measurement signal strength of other reference signals), and the terminal determines, according to the measurement of the reference signal, other signals or channel data having association relationship (referred to as a quasi-co-location relationship in the communication technical standards) with the received signal.

Further, it should be noted that the beam signal transmission method according to the embodiments of the present disclosure uses a beam signal as an SSB signal as an example to describe the method in the embodiments of the present disclosure in detail, but the beam signal is not limited to only an SSB signal, for example, may also be a Channel State Indication-Reference Signal (CSI-RS), etc.

In the beam signal transmission method of the embodiments of the present disclosure, according to one embodiment, the mode information includes a mode type, and the mode type indicates: a sending sequence of a plurality of corresponding beams, the number of sending beams required in one transmission period, a beam direction of each beam, a width of each beam, and a sending duration of each beam;

in the step S320, according to the plurality of beams indicated by the mode information, sending the transmission signals sequentially through each beam in a time division manner in one transmission period, includes:
  according to the sending sequence of the plurality of beams, the number of sending beams required, the beam direction of each beam, the width of each beam and the sending duration of each beam corresponding to the mode type, sending the transmission signals sequentially through each beam in the time division manner in one sending period.

When the mode information indicates one mode type, the specific manner of the beam signal transmission method according to the embodiments of the present disclosure is illustrated.

Embodiment 1

Figure 5:
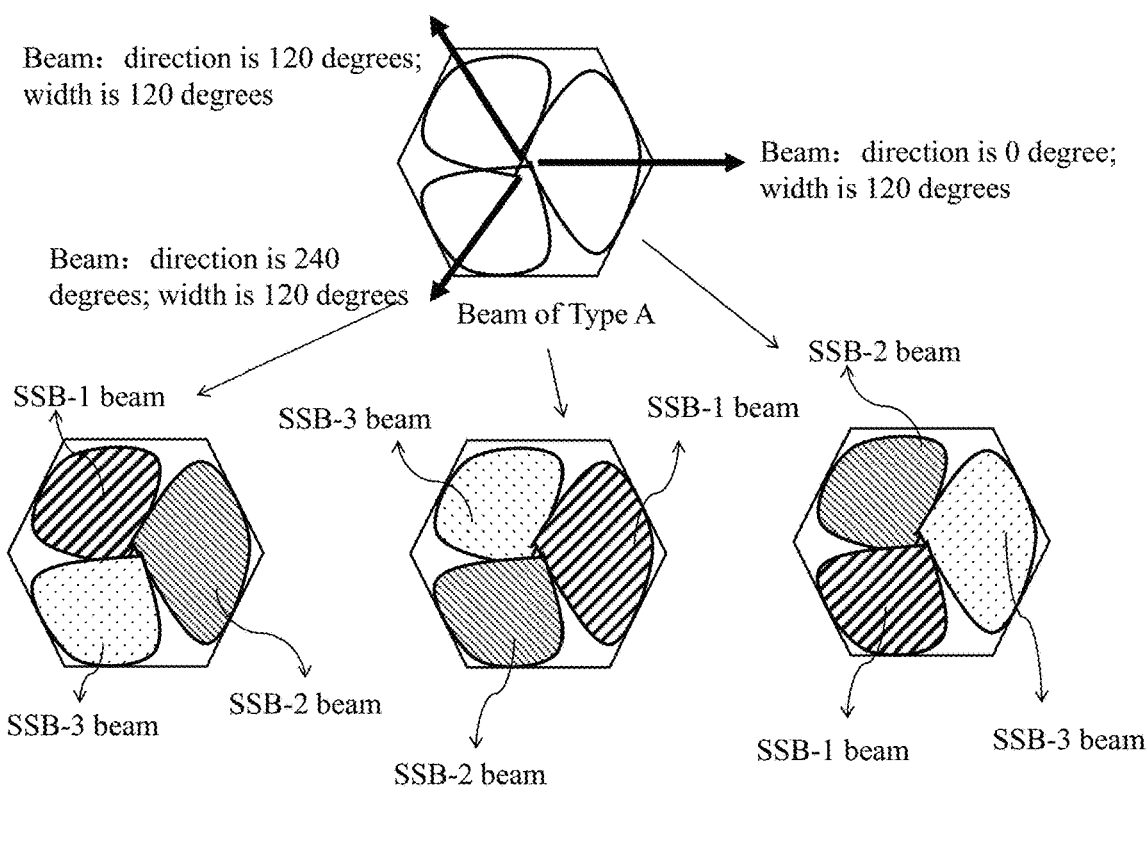

In this embodiment, a case that a cell corresponding to a network-side node is an omnidirectional cell, i.e., a cell covers a 360-degree horizontal range, is taken as an example, as shown in FIG. 5, there are three SSB beam coverage areas in a cell, which are respectively: a direction of 0 degree and a width of 120 degrees; a direction of 120 degrees and a width of 120 degrees; and a direction of 240 degrees and a width of 120 degrees. Therefore, the sending directions corresponding to the three sending beams include three directions, directional angles of which are 0 degrees, 120 degrees and 240 degrees respectively, and a beam width of each sending beam is about 120 degrees.

A combination of covering one cell by three SSB beams includes three types, as shown in FIG. 5, three mode types of cells may be formed according to different beam composition sequences, i.e., a A1 cell, a A2 cell, and a A3 cell of FIG. 5.

In the A1 cell, the beam direction of the SSB-1 beam is a 120-degree direction, the beam direction of the SSB-2 beam is a 0 degree direction, and the beam direction of the SSB-3 beam is a 240-degree direction.

In the A2 cell, the beam direction of the SSB-1 beam is the 0 degree direction, the beam direction of the SSB-2 beam is the 240 degree direction, and the beam direction of the SSB-3 beam is the 120-degree direction.

In the A3 cell, the beam direction of the SSB-1 beam is the 240 degree direction, the beam direction of the SSB-2 is the 120 degree direction, and the beam direction of the SSB-3 beam is the 0 degree direction.

It should be noted that, when the sending duration of each beam is coordinated, optionally, the unit of the sending duration may be a slot (such as when a subcarrier spacing is 15 kHz, a time length of a slot is 1 ms), of course, the unit may be other lengths, such as a symbol, and the subcarrier spacing may also be another value, such as 30 kHz, 60 kHz, 120 kHz, or the like, which is not limited in the present disclosure.

Based on the mode type in the foregoing embodiment, the beam signal transmission method according to the embodiments of the present disclosure specifically includes:

obtaining, by the base station (i.e., the network-side node), the mode information of the sending beam.

Specifically, according to the above description, the mode information may be determined by means of distributed negotiation or centralized coordination. Optionally, beam transmission between base stations/cells participating in the SFN mode transmission needs to be coordinated and synchronized, and mode information of sending beams of each base station is determined.

It should be noted that coordination and synchronization of beam transmission between the base stations/cells participating in the SFN mode transmission include and are not limited to: that data/signals sent by beam signals between the plurality of base stations/cells are same, that the sending time is the same, that the beam direction is implemented according to an agreed direction, etc.

Optionally, in this embodiment, the mode information includes and is not limited to at least one of: the sending sequence of the plurality of beams, the number of sending beams required in one sending period, the beam direction of each beam, the width of each beam and the sending duration of each beam. The mode information is used to indicate one of the above mode types A1, A2, and A3.

Optionally, the mode information may indicate the mode information by indicating the mode type of the cell, for example, by indicating mode identifiers of the above mode types A1, A2 and A3, indicating the sending sequence of the corresponding plurality of beams, the number of sending beams needed in one sending period, the beam direction of each beam, the width of each beam, the sending duration of each beam and the like.

Optionally, the mode information may further include at least one of: the identification information of the base station, the period information of the sending beams, and the period offset value of the sending period.

For example, the information included in the mode information may be in the form of Table 2 as follows:

TABLE 2

| Items of contents of the mode information | Parameter information in the mode information | Description |
|---|---|---|
| Cell Identity (CELL ID) | Integer type | A cell beam transmission parameter with the identity being this value; the ID is an identifier known among base stations, the terminal side may not be aware of this ID |

TABLE 2-continued

| Items of contents of the mode information | Parameter information in the mode information | Description |
|---|---|---|
| Cell type Actual number of SSB beams | {A1, A2, A3} N = 3 | Enumerate one of beam types Configurable, which is assumed to be 3, i.e., one cell is covered by 3 SSB beams |
| Sending period/ duration | Period T, period offset O; | The unit is a slot, the number of sending slots of each beam is: rounding (T/N); a sending sequence is: SSB-1, SSB-2, . . . SSB-N |

It should be noted that, in the information included in the foregoing mode information, the mode information of the sending beam is indicated by indicating the mode type of the cell (i.e. one of A1, A2, and A3), for example, indicating the maximum number of beams, the directional angle of each beam, the width of the beam, a beam numbering value, and the like. In addition to using the indication method, each piece of beam information corresponding to the mode type may also be defined item by item and indicated in the mode information, without indicating the mode type of the cell, which is not limited herein.

In addition, the method of obtaining the mode information may also be coordinated through an interface between the base stations and then may be indicated to the corresponding base station or may be indicated through other interfaces, which are not specifically limited herein.

On basis of the obtained mode information, the base station sends a signal or data through each beam sequentially in a time division manner according to the mode information, i.e., sends the transmission signal.

As shown in FIG. 6, according to the obtained mode information, in this embodiment, there are three beam coverage in the cell corresponding to the base station, which are: a SSB-1 beam, the beam direction of which is the 120 degree direction, and the beam width of which is 120 degrees; a SSB-2 beam, the beam direction of which the 0 degree direction, and the beam width of which is 120 degrees; and a SSB-3 beam, the beam direction of which is the 240 degree direction, and the beam width of which is 120 degrees.

In addition, the period of sending beams in the cell is 3 slots, where the signal is sent on the slot 0 in the direction and the width of the SSB-1 beam, the signal is sent on the slot 1 in the direction and the width of the SSB-2 beam, and the signal is sent on the slot 2 in the direction and the width of the SSB-3 beam.

In this embodiment of the present disclosure, the beam type of each beam sent by each base station (i.e., each network-side node) is the same as the beam type of the beam sent by at least one adjacent base station at a corresponding time instant, and the transmission signals being sent are the same, thereby forming an SFN technology.

As shown in FIG. 7, when the cell participating in the SFN technology includes seven cells and the beam signals are sent by using the above mode information, the received signal power of the terminals located at the edges C1, C2, and C3 of the cell is 9, and the received signal power in case of the cell-level SFN is 4.42; relative to the received power 4.42 of the cell-level SFN, a performance gain is 3.09 dB. The received signal power of the terminals located at the cell edges D1, D2 and D3 is 6, and relative to the received power 4.42 of the cell-level SFN, a gain is about 1.3 dB.

For the terminal, after obtaining the mode information of sending beams of the base station, the transmission signals on the beams are measured according to the plurality of beams indicated by the mode information.

Specifically, measuring the transmission signals on the beams according to the plurality of beams indicated by the mode information includes:

according to the obtained beam information, measuring the received plurality of beams respectively, and selecting the beam, with the best performance, in the measured beams to receive the transmission signal.

Embodiment 2

Figure 8:
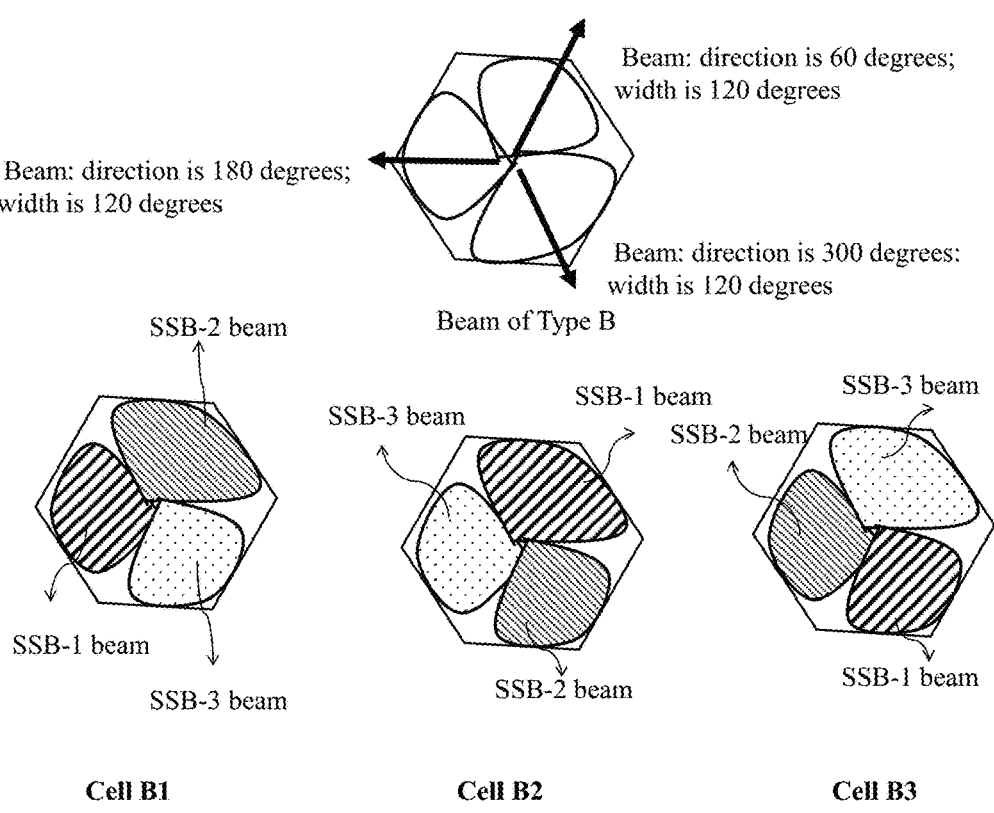
FIG. 8 to FIG. 10 illustrate schematic diagrams of a mode structure of a beam signal in Embodiment 2.

In this embodiment, a case that a cell corresponding to a network-side node is an omnidirectional cell, i.e., a cell covers a 360-degree horizontal range, is taken as an example, as shown in FIG. 8, there are three SSB beam coverage in a cell, which are respectively: a direction of 60 degrees and a width of 120 degrees; a direction of 180 degrees and a width of 120 degrees; and a direction of 300 degrees and a width of 120 degrees. Therefore, the sending directions corresponding to the three sending beams include three directions, directional angles of which are 60 degrees, 180 degrees and 300 degrees respectively, and a beam width of each sending beam is about 120 degrees.

A combination of covering one cell by three SSB beams includes three types, as shown in FIG. 8, three mode types of cells may be formed according to different beam composition sequences, i.e., a B1 cell, a B2 cell, and a B3 cell of FIG. 8.

In the B1 cell, the beam direction of the SSB-1 beam is a 180-degree direction, the beam direction of the SSB-2 beam is a 60-degree direction, and the beam direction of the SSB-3 beam is a 300-degree direction.

In the B2 cell, the beam direction of the SSB-1 beam is the 60-degree direction, the beam direction of the SSB-2 beam is the 300 degree direction, and the beam direction of the SSB-3 beam is the 180-degree direction.

In the B3 cell, the beam direction of the SSB-1 beam is the 300-degree direction, the beam direction of the SSB-2 is the 180-degree direction, and the beam direction of the SSB-3 beam is the 60-degree direction.

It should be noted that, when the sending duration of each beam is coordinated, optionally, the unit of the sending duration may be a slot (such as when a subcarrier spacing is 15 kHz, a time length of a slot is 1 ms), of course, the unit may be other lengths, such as a symbol, and the subcarrier spacing may also be another value, such as 30 kHz, 60 kHz, 120 kHz, or the like, which is not limited in the present disclosure.

Based on the mode type in the foregoing embodiment, the beam signal transmission method according to the embodiments of the present disclosure specifically includes:

obtaining, by the base station (i.e., the network-side node), the mode information of the sending beams.

Specifically, according to the above description, the mode information may be determined by means of distributed negotiation or centralized coordination. Optionally, beam transmission between base stations/cells participating in the SFN mode transmission needs to be coordinated and synchronized, and mode information of sending beams of each base station is determined.

Optionally, in this embodiment, the mode information includes and is not limited to at least one of: the sending sequence of the plurality of beams, the number of sending beams required in one sending period, the beam direction of each beam, the width of each beam and the sending duration of each beam. The mode information is used to indicate one of the above mode types B1, B2, and B3.

Optionally, the mode information may indicate the mode information by indicating the mode type of the cell, for example, by indicating mode identifiers of the above mode types B1, B2 and B3, indicating the sending sequence of the corresponding plurality of beams, the number of sending beams needed in one sending period, the beam direction of each beam, the width of each beam, the sending duration of each beam and the like.

Optionally, the mode information may further include at least one of: the identification information of the base station, the period information of the sending beams, and the period offset value of the sending period.

For example, the information included in the mode information may be in the form of Table 3 as follows:

TABLE 3

| Items of contents of the mode information | Parameter information in the mode information | Description |
| --- | --- | --- |
| CELL ID | Integer type | A cell beam transmission parameter with the identity being this value; the ID is an identifier value among base stations |
| Cell type | {B1, B2, B3} | Enumerate one of content types |
| Actual number of SSB beams | N = 3 | Configurable, which is assumed to be 3, i.e., one cell is covered by 3 SSB beams |
| Sending period/ duration | Period T, period offset O; | The unit is a slot, the number of sending slots of each beam is: rounding (T/N); a sending sequence is: SSB-1, SSB-2, . . . SSB-N |

It should be noted that, in the information included in the foregoing mode information, the mode information of the sending beam is indicated by indicating the mode type of the cell (i.e. one of B1, B2, and B3), for example, indicating the maximum number of beams, the directional angle of each beam, the width of the beam, a beam numbering value, and the like. In addition to using the indication method, each piece of beam information corresponding to the mode type may also be defined item by item and indicated in the mode information, without indicating the mode type of the cell, which is not limited herein.

On basis of the obtained mode information, the base station sends a signal or data through each beam sequentially in a time division manner according to the mode information, i.e., sends the transmission signal.

Figure 9:
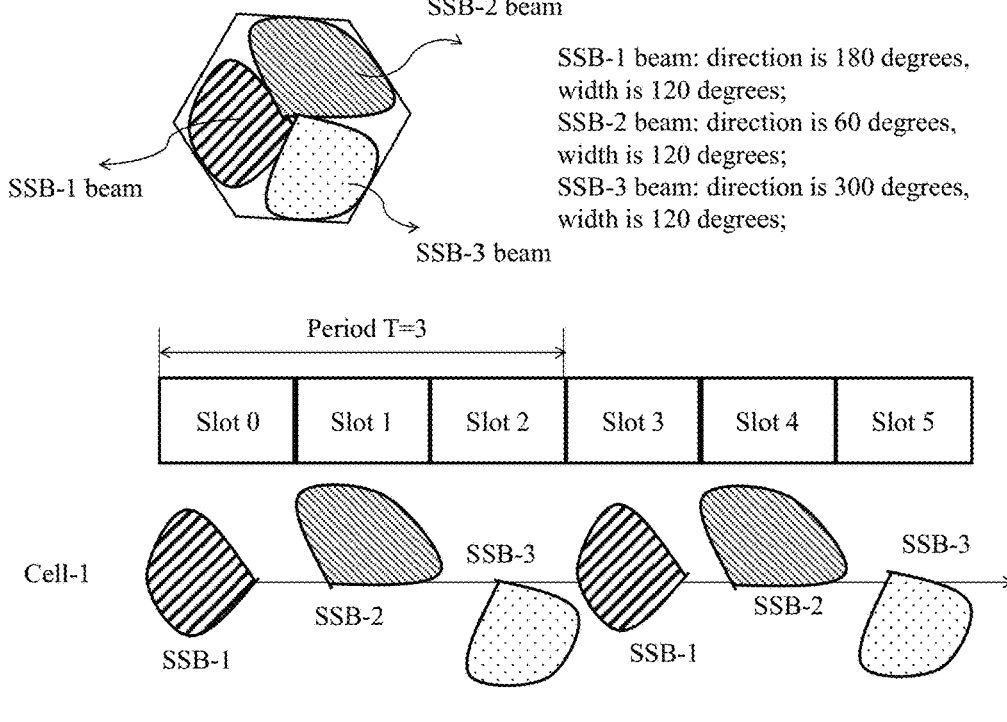

As shown in FIG. 9, in case that the mode type indicated by the mode information is the B1, in this embodiment, according to the obtained mode information, there are three beam coverage in the cell corresponding to the base station, which are: a SSB-1 beam, the beam direction of which is the 180-degree direction, and the beam width of which is 120 degrees; a SSB-2 beam, the beam direction of which the 60-degree direction, and the beam width of which is 120 degrees; and a SSB-3 beam, the beam direction of which is the 300-degree direction, and the beam width of which is 120 degrees.

In addition, the period of sending beams in the cell is 3 slots, where the signal is sent on the slot 0 in the direction and the width of the SSB-1 beam, the signal is sent on the slot 1 in the direction and the width of the SSB-2 beam, and the signal is sent on the slot 2 in the direction and the width of the SSB-3 beam.

Figure 10:
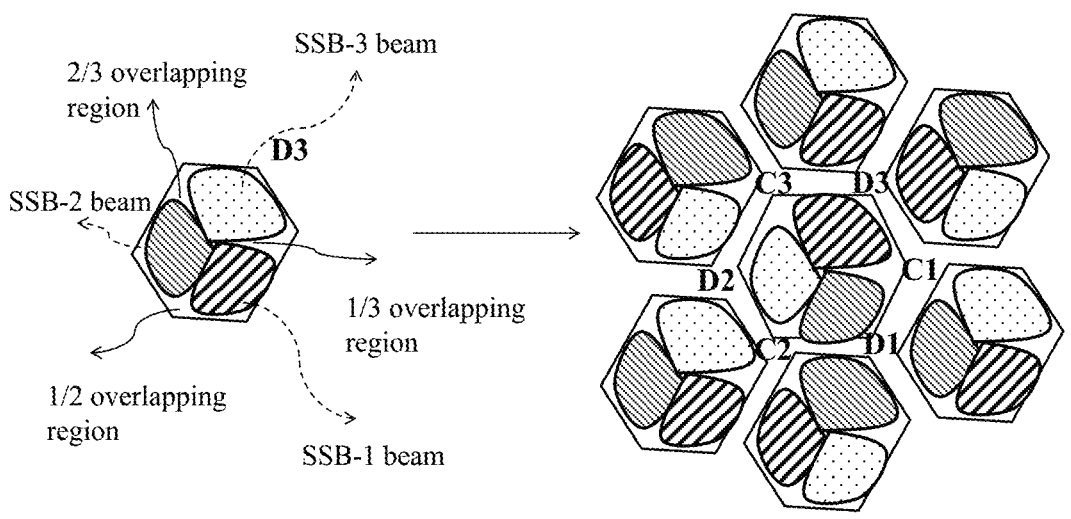

As shown in FIG. 10, when the cell participating in the SFN technology includes seven cells and the beam signals are sent by using the above mode information, the received signal power of the terminals located at the edges C1, C2, and C3 of the cell is 6, and the received signal power in case of the cell-level SFN is 4.42; relative to the received power 4.42 of the cell-level SFN, a performance gain is 1.3 dB. The received signal power of the terminals located at the cell edges D1, D2 and D3 is 9, and relative to the received power 4.42 of the cell-level SFN, a gain is about 3.09 dB.

For the terminal, after obtaining the mode information of sending beams of the base station, the transmission signals on the beams are measured according to the plurality of beams indicated by the mode information.

Similar to the Embodiment 1, after the terminal obtains the mode information of the sending beams of the base station, the terminal measures the transmission signals on the beams according to the plurality of beams indicated by the mode information.

Specifically, measuring the transmission signals on the beams according to the plurality of beams indicated by the mode information includes:

according to the obtained beam information, measuring the received plurality of beams respectively, and selecting the beam, with the best performance, in the measured beams to receive the transmission signal.

According to the beam information transmission method of the embodiments of the present disclosure, optionally, the mode information includes at least two mode types, and at least one of the sending sequence of the sending beams, the number of sending beams required in one sending period, the beam direction of each beam, the width of each beam, and a sending duration of each beam corresponding to one of the at least two mode types is different from that of another mode type of the at least two mode types.

Sending the transmission signals through each beam sequentially in the time division manner in one sending period according to the plurality of beams indicated by the mode information includes:

sequentially sending the transmission signals through the plurality of beams indicated by each mode type in one sending period in the time division manner in a preset sequence of the at least two mode types.

Specifically, the transmission signals sent by the plurality of beams indicated by the same mode type are the same, or are the same information repeatedly sent.

Transmission signals sent by the plurality of beams indicated by different mode types are different.

Specifically, by using the beam sending manners of the at least two mode types indicated in the mode information, transmission signals can be sent in one sending period according to beams of the two mode types, specifically, transmission signals are sequentially sent through the plurality of beams indicated by each mode type in the time division manner, that is, the SFN cell is formed in a manner of beam switching of the at least two mode types.

When the mode information indicates two mode types, the specific manner of the beam signal transmission method according to the embodiments of the present disclosure is illustrated.

Embodiment 3

This embodiment combines the embodiment 1 and the embodiment 2. The mode type may include the first mode type A1, A2 and A3, and the second mode type B1, B2 and B3, the mode information may indicate the A1 in the first mode type and the B1 in the second mode type, for sending the transmission signals.

Optionally, in this embodiment, the mode information includes, but is not limited to, at least one of: the sending sequence of the plurality of beams, the number of sending beams needed in one sending period, the beam direction of each beam, the width of each beam and the sending duration of each beam. The mode information is configured to indicate one mode type of above mode types B1, B2, and B3 and one mode type of above mode types A1, A2 and A3, such as the mode type A1 and the mode type B1.

Optionally, the mode information may indicate the mode information by indicating the mode type of the cell, for example, by indicating mode identifiers of the above mode types A1 and B1, indicating the sending sequence of the plurality of beams of each corresponding mode type, the number of sending beams required in one sending period, the beam direction of each beam, the width of each beam, the sending duration of each beam and the like.

Optionally, the mode information may further include at least one of: the identification information of the base station, the period information of the sending beams, and the period offset value of the sending period.

For example, the information included in the mode information may be in the form of Table 4 as follows:

TABLE 4

| Items of contents of the mode information | Parameter information in the mode information | Description |
|---|---|---|
| Cell ID | Integer type is 1 | A cell beam transmission parameter with the identity being this value; the ID is an identity value known among base stations |
| Cell type | A1, B1 | Each one type is taken in the enumerated content types |
| Actual number of SSB beams | N = 6 | Configurable, which is assumed to be 6, i.e., one cell is covered by 6 SSB beams, three of the 6 SSB beams is of the A type and the remaining three of the 6 SSB beams is of the B type |
| Sending period/ duration | Period T = 6, period offset O; | The unit is a slot, the number of sending slots of each beam is: rounding (T/N); a sending sequence is: SSB-1, SSB-2, . . . SSB-N |

It should be noted that, in the information included in the foregoing mode information, the mode information of the sending beam is indicated by indicating the mode types of the cell (i.e. the indicated mode type A1 and the indicated mode type B1), for example, indicating the maximum number of beams, the directional angle of each beam, the width of the beam, a beam numbering value, and the like in each mode type. In addition to using the indication method, each piece of beam information corresponding to each mode type may also be defined item by item and indicated in the mode information, without indicating the type information of the mode type of the cell, which is not limited herein.

Figure 11:
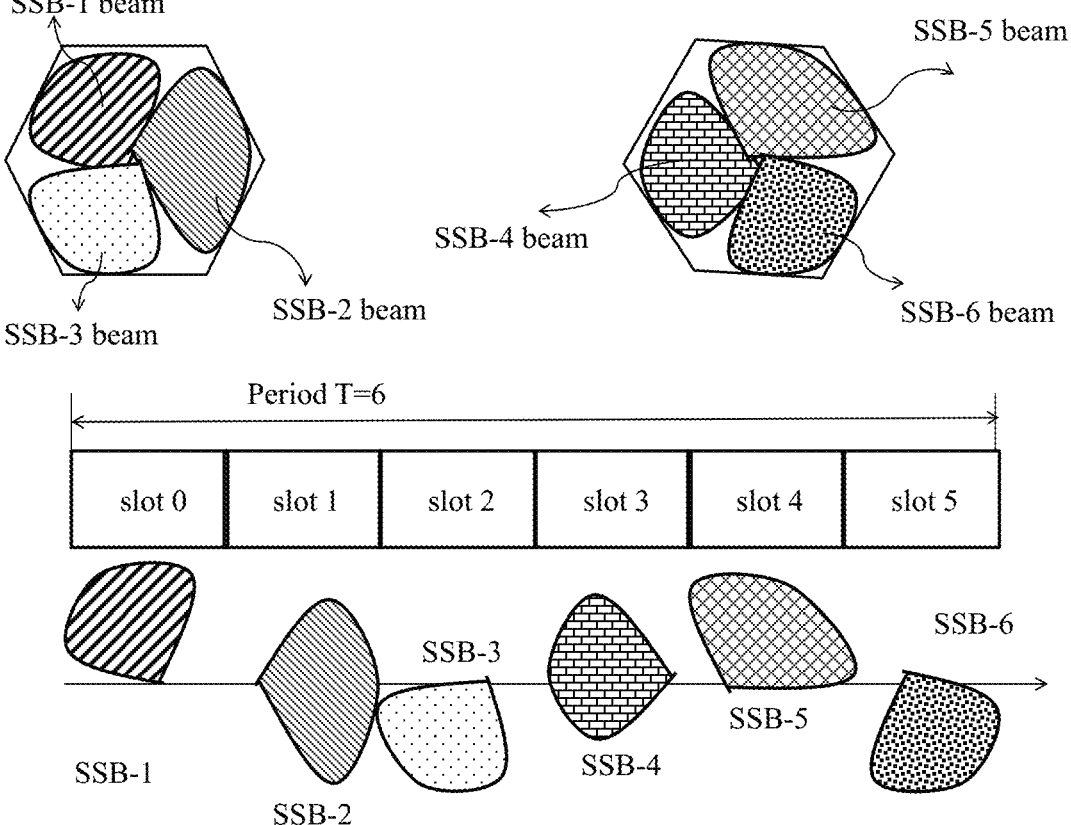

As shown in FIG. 11, according to the obtained mode information, in this embodiment, there are six beam coverage in a cell having a numbering value 1 after the cell receives the mode information. Specifically, beams in the first part of the sending period include: a SSB-1 beam, the beam direction of which is the 120-degree direction, and the beam width of which is 120 degrees; a SSB-2 beam, the beam direction of which the 0-degree direction, and the beam width of which is 120 degrees; and a SSB-3 beam, the beam direction of which is the 240-degree direction, and the beam width of which is 120 degrees. Beams in the second part of the sending period include: a SSB-4 beam, the beam direction of which is the 180-degree direction, and the beam width of which is 120 degrees; a SSB-5 beam, the beam direction of which the 60-degree direction, and the beam width of which is 120 degrees; and a SSB-6 beam, the beam direction of which is the 300-degree direction, and the beam width of which is 120 degrees.

In addition, the sending period of the beams is 6 slots, where the signal is sent on the slot 0 in the direction and the width of the SSB-1 beam, the signal is sent on the slot 1 in the direction and the width of the SSB-2 beam, the signal is sent on the slot 2 in the direction and the width of the SSB-3 beam, the signal is sent on the slot 3 in the direction and the width of the SSB-4 beam, the signal is sent on the slot 4 in the direction and the width of the SSB-5 beam, the signal is sent on the slot 5 in the direction and the width of the SSB-6 beam, and so on. Using this method, beams in each period are sent sequentially.

After the terminal obtains the mode information of the sending beams of the base station, the terminal measures the transmission signals on the beams according to the plurality of beams indicated by the mode information.

Specifically, in one embodiment, measuring the transmission signals on the beams according to the plurality of beams indicated by the mode information includes:

measuring the beams respectively according to the beam information of the beams indicated by different mode types, obtaining measurement results;

selecting at least one beam to perform reception of the transmission signals, from the beams of different mode types according the measurement results.

Optionally, when selecting at least one beam to perform reception of the transmission signals from the beams of different mode types, the beam, with the best performance, is selected to perform the reception of the transmission signals, from the measured beams of each mode type.

In this embodiment of the present disclosure, the beam type of each beam sent by each base station (i.e., each network-side node) is the same as the beam type of the beam sent by at least one adjacent base station at a corresponding time instant, and the transmission signals being sent are the same, thereby forming an SFN technology.

As shown in FIG. 7, when the cell participating in the SFN technology includes seven cells and the beam signals are sent by using the above mode information, the received signal power of the terminals located at the edges C1, C2, and C3 of the cell is 9, and the received signal power in case of the cell-level SFN is 4.42; relative to the received power 4.42 of the cell-level SFN, a performance gain is 3.09 dB. The received signal power of the terminals located at the cell edges D1, D2 and D3 is 6, and relative to the received power 4.42 of the cell-level SFN, a gain is about 1.3 dB.

For the terminal, after obtaining the mode information of sending beams of the base station, the transmission signals on the beams are measured according to the plurality of beams indicated by the mode information.

Specifically, measuring the transmission signals on the beams according to the plurality of beams indicated by the mode information includes:

according to the obtained beam information, measuring the received plurality of beams respectively, and selecting the beam, with the best performance, in the measured beams to receive the transmission signal.

In this embodiment, beams of a plurality of SSBs needs to be measured, and the SSB beam with better performance can be selected to perform reception of signals and data. For example, the terminal at the C1 point selects the beam direction of the SSB-1 to receive the signal and the data, or receives the data and the signal in the beam direction of the SSB-1. For example, the terminal at the point D1 selects the beam direction of the SSB-5 to receive the signal and the data, or receives the data and the signal in the beam direction of the SSB-5.

In another embodiment, measuring the transmission signals on the beams according to the plurality of beams indicated by the mode information includes:

measuring each beam in target beam pair information in a plurality of pieces of beam pair information, to obtain a transmission signal on each measured beam;

wherein an area where the terminal is located is within a coverage range of beams included in the target beam pair information.

In this embodiment, the beams of the two mode types need to be measured respectively, the beams of the two mode types are distinguished, and the beams with better signals are selected in the two mode types to receive the signals and the data respectively.

In this embodiment, the base station needs to send beam information of beams indicated by different mode types to the terminal, so that the terminal distinguishes the beams of the two different mode types.

Optionally, the base station may further send a plurality of pieces of beam pair information to the terminal, wherein each piece of beam pair information includes beam information of at least two beams, at least two beams in the same beam pair information belong to different mode types, respectively, and in one sending period, at least two beams of the same beam pair are respectively sent at different time instants and cover the same area of a signal coverage range.

The base station sends the beam pair information to the terminal, so that the terminal can determine the beam to be measured, according to the received beam pair information.

Specifically, taking as an example that 6 SSBs are sent one sending period in embodiment 3, in one embodiment, the base station divides bursts of 6 SSBs into two SSB sub-bursts; SSB sub-burst-1 includes SSB-1, SSB-2, and SSB-3. SSB sub-burst-2 includes SSB-4, SSB-5, and SSB-6. In this embodiment, a base station may indicate information of SSBs in two SSB sub-bursts to a terminal by means of a system message, and different SSB sub-bursts represent different mode types. Optionally, each SSB corresponds to a number value, and the system message indicates, to the terminal, information of the SSBs in the two SSB sub-bursts by indicating the numbering values of the SSBs, i.e. indicates beam information of the beams in the two mode types.

In another embodiment, the base station may define a plurality of SSB pairs according to a mode type to which a beam belongs, i.e. define a plurality of beam pairs. Taking as an example that 6 SSBs are sent in one sending period in embodiment 3, the plurality of beams include a beam pair 1 including SSB-1 and SSB-4, a beam pair 2 including SSB-2 and SSB-5, and a beam pair 3 including SSB-3 and SSB-6, wherein beam pair information of the plurality of beam pairs may be indicated to the terminal through a system message. Specifically, the principle of dividing the beams included in each beam pair is: each piece of beam pair information includes beam information of at least two beams, at least two beams in the same beam pair information belong to different mode types, respectively, and in one sending period, at least two beams of the same beam pair are respectively sent at different time instants and cover the same area of the signal coverage range.

The beam pair information is sent to the terminal by the network side device, and when the terminal measures the transmission signals on the beams according to the plurality of beams indicated by the mode information, the terminal measures each beam in each piece of the plurality of pieces of beam pair information to obtain the transmission signal on the measured beam.

For example, the terminal at the point D1 selects the SSB-1 beam in a beam pair 1 as the beam of receiving the signal, and selects the SSB-4 beam in a beam pair 2 as the beam of receiving the signal.

Figure 12:
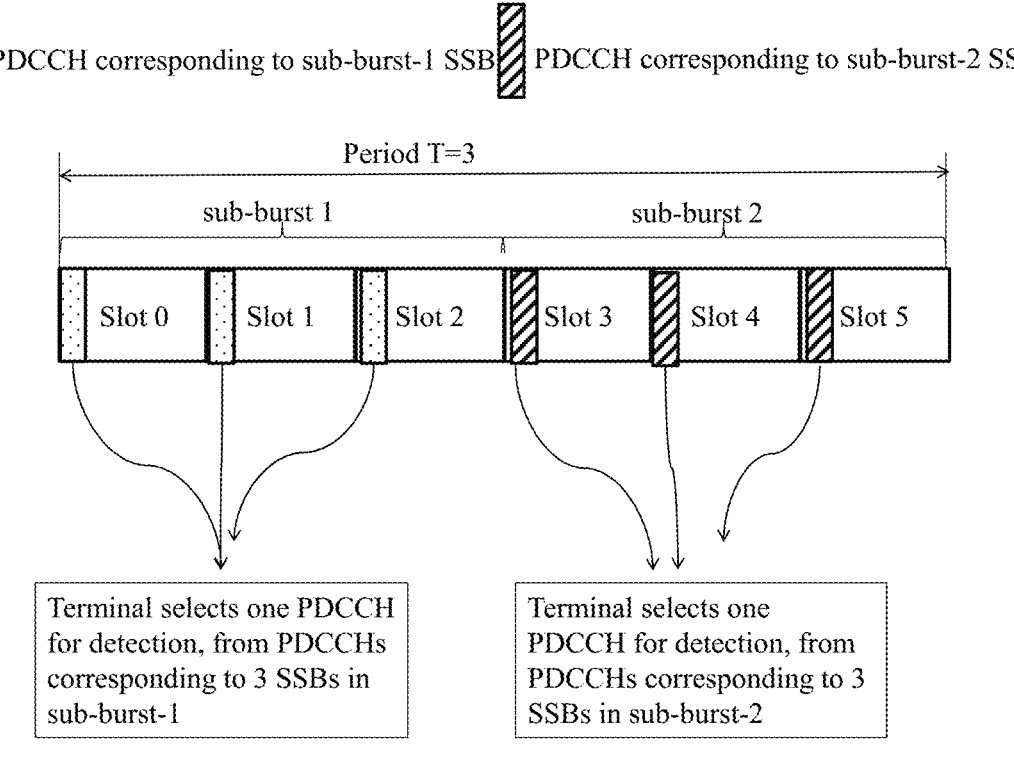

It should be noted that when the base station divides the SSBs into two SSB sub-bursts, the terminal and the base station both consider that the sent signals/data on all beams in the sub-burst-1 are the same, or are repeatedly sent. The sent signals/data on the beams of sub-burst-1 and sub-burst-2 cannot be assumed to be the same or duplicate. Taking as an example that the MBS is to perform the dynamic scheduling, as shown in FIG. 12, the terminal needs to detect control channels corresponding to two SSBs, that is, one downlink control channels (Physical Downlink Control Channel, PDCCH) is selected from PDCCHs corresponding to three SSBs in Sub-Burst-1, to perform detection. The terminal selects another one PDCCH from the PDCCHs corresponding to the three SSBs in Sub-Burst-2, to perform the detection. That is, one beam is selected from each mode type and from beams of two different mode types, for signal detection or data detection. Optionally, the beam with the best signal quality is selected from each mode type for signal detection or data detection.

In another embodiment, optionally, according to the beam signal transmission method of the present disclosure, one of the two SSB sub-bursts may be sent as an SSB burst from the perspective of the base station, and another SSB sub-burst uses the CSI-RS, for example, using CSI-RS 1, CSI-RS 2, and CSI-RS 3 to respectively replace the SSB-4 beam signal, the SSB-5 beam signal, the SSB-6 beam signal in the embodiment.

In this embodiment, from the terminal side's perspective, in addition to detecting the SSB signal, the terminal also needs to detect or measure one or more CSI-RS signals, and select one beam of a CSI-RS signal from the CSI-RS signals as a receiving beam.

Figure 13:
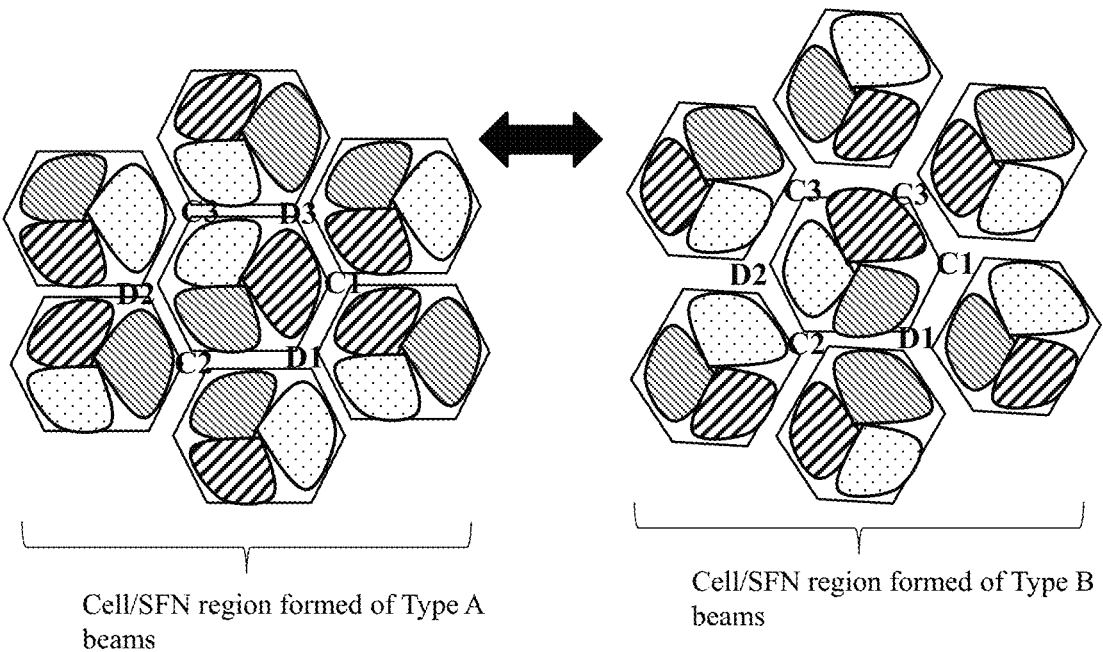

As shown in FIG. 13, in Embodiment 3, according to the beam signal transmission method in the present disclosure, the transmission beam in the SFN area has a mode type A in the first half period, and the transmission beam in the SFN area has a mode type B in the second half period, and the beams of the two mode types are switched in one sending period, so that performance of the terminals at the cell edge, such as C1, C2 and C3, and D1, D2, and D3 are not differentiated, the received signal power is about 7.5, and relative to the received signal power 4.2 of the cell-level SFN technology, a performance gain is approximately 2.5 dB.

Embodiment 4

In the embodiment 4, detailed description of the beam signal transmission method in the embodiments of the present disclosure is given to the example that the cell corresponding to the network-side node is a sector cell, that is, the cell coverage is a sector.

In this embodiment, the cell is formed into a 120-degree sector cell, that is, the cell covers a horizontal range of 120 degrees, and based on the sector cell in this form, a 360-degree range can be covered by three sectors to form a base station. In this embodiment, the mode type of the sector cell may be defined as a type A sector, where the directional angles of the type A sectors are 0 degree, 120 degrees, and 240 degrees. In addition, a coverage area of the sector cell includes three different SSB beam coverage. The beam width of each SSB is about 40 degrees; there are three sending directions; and coverage of covering one cell by three SSB beams has three types, as shown in FIG. 14.

In a type A sector cell of 120 degrees, three SSB beam coverage is included, and three SSB beam coverage are respectively:

SSB-2, the beam direction of which is 0 degree and the beam width of which is 40 degrees;

SSB-1, the beam direction of which is +40 degrees and the beam width of which is 40 degrees;

SSB-3, the beam direction of which is −40 degrees and the beam width of which is 40 degrees.

In addition, it should be noted that, for convenience of description, the beam direction is relative to a sector direction, that is, a direction same as the sector direction is defined as 0 degree.

In this embodiment, a 360-degree area is formed of three sector cells, each of which is 120 degrees. The beam information sent in each sector cell may be defined in the foregoing manner. As shown in FIG. 14, the sector cells included in the 360-degree full-range cell are A1, A2 and A3 according to different positions of the sector cells. Optionally, in order to maximize the performance of the SFN, the numbering values of SSB beams in adjacent sectors are the same, and the sending time instants are the same, so that the purpose of merging two SSBs among the sectors can be achieved. That is, specifically, when the plurality of sector cells enclose to form a 360-degree cell, the adjacent sector cells are in adjacent regions, and transmit beams at the same time, and the transmission information on the transmitted beams is the same, so that the combination of the transmission beams among the sectors is realized.

It should be noted that, when the sending duration of each beam is coordinated, optionally, the unit of the sending duration may be a slot (such as when a subcarrier spacing is 15 kHz, a time length of a slot is 1 ms), of course, the unit may be other lengths, such as a symbol, and the subcarrier spacing may also be another value, such as 30 kHz, 60 kHz, 120 kHz, or the like, which is not limited in the present disclosure.

Based on the mode type in the foregoing embodiment, the beam signal transmission method according to the embodiments of the present disclosure specifically includes:

obtaining, by the base station (i.e., the network-side node), the mode information of the sending beam.

Specifically, according to the above description, the mode information may be determined by means of distributed negotiation or centralized coordination. Optionally, beam transmission between base stations/cells participating in the SFN mode transmission needs to be coordinated and synchronized, and mode information of sending beams of each base station is determined.

Optionally, in this embodiment, the mode information includes and is not limited to at least one of: the sending sequence of the plurality of beams, the number of sending beams required in one sending period, the beam direction of each beam, the width of each beam and the sending duration of each beam.

Further, in this embodiment, in addition to the above information, the mode information may further include a sector direction angle, a sector width, etc., for indicating the type of the sector cell.

Specifically, the mode information may indicate the sector type of the transmitted beam and the beam pattern of the transmitted beam in the sector type by indicating one of the above mode types A1, A2, and A3.

Optionally, the mode information may further include at least one of: the identification information of the base station, the period information of the sending beams, and the period offset value of the sending period.

For example, the information included in the mode information may be in the form of Table 5 as follows:

TABLE 5

| Items of contents of the mode information | Parameter value | Description |
|---|---|---|
| Cell ID | Integer type | A cell beam transmission parameter with the identity being this value; the ID is an identifier value known among base stations |
| Sector cell type | Types {A1, A2, A3} | Types of sector cells, including a sector direction angle, and a composition of SSB beams, a sector width, and the like. |
| The number of SSB beams in a sector cell | N = 3 | Configurable, which is assumed to be 3, i.e., one cell is covered by 3 SSB beams |
| Sending period/ duration | Period T, period offset O; | The unit is a slot, the number of sending slots of each beam is: rounding (T/N); a sending sequence is: SSB-1, SSB-2, . . . SSB-N |

It should be noted that, in the information included in the foregoing mode information, the mode information of the sending beam is indicated by indicating the mode type (i.e. one of A1, A2, and A3) of the sector cell, for example, indicating the maximum number of beams, the directional angle of each beam, the width of the beam, a beam numbering value, the directional angle of a sector cell, and a width of a sector and the like. In addition to using the indication method, each piece of beam information corresponding to the mode type may also be defined item by item and indicated in the mode information, without indicating the mode type of the cell, which is not limited herein.

Optionally, in an embodiment, the beam width may be indicated to the terminal by means of an indication method, and in another embodiment, a default calculation method may also be used, for example, the beam width is equal to the sector width divided by the number of SSB beams, for example, when the sector width is 120 degrees and the number of beams transmitted in one sector cell is 3, the beam width may be calculated as: $120/3=40$. At the same time, the numbering value of the SSB beam may also be indicated or determined by default, for example, it is considered by fault that the direction 0 degree relative to the sector direction corresponds to SSB-2, the direction 40 degrees relative to the sector direction corresponds to SSB-1, the direction −40 degrees relative to the sector direction corresponds to SSB-3.

On the basis of the obtained mode information, the base station sequentially sends a signal or data through each beam in a time division manner according to the mode information, that is, sends the transmission signal.

For example, as shown in FIG. 15, after the sector cell numbered 1 receives the mode information, the sector cell numbered 1 determines that the sector cell has three beam coverage, and the information is:

the SSB-1 beam: a direction of which is 40 degrees, a width of which is 40 degrees;

the SSB-2 beam: a direction of which is 0 degree, a width of which is 40 degrees; the SSB-3 beam: a direction of which is −40 degrees, a width of which is 40 degrees.

In addition, in one sector cell, the transmission period of the beam signal is 3 slots, the signal is sent on the slot 0 in the direction and the width of the SSB-1 beam, the signal is sent on the slot 1 in the direction and the width of the SSB-2 beam, and the signal is sent on the slot 2 in the direction and the width of the SSB-3 beam.

Beam signals are sent by using the above mode information, as shown in FIG. 16, terminals at C1, C2 and C3 of the edges of the cell have the received signal power 18, and relative to the received power 3 of the sector-cell-level SFN, a performance gain of 7.8 dB may exist. The terminals at D1, D2 and D3 of the edges of the cell have the received signal power of 4.5, and the received power of the cell-level SFN is 3. Relative to the received power of the cell-level SFN, a gain of 1.7 dB exists.

After the terminal obtains the mode information of the sending beams from the base station, the transmission signals on the beams are measured according to the plurality of beams indicated by the mode information.

Specifically, measuring the transmission signals on the beams according to the plurality of beams indicated by the mode information includes:

according to the obtained beam information, measuring the received plurality of beams respectively, and selecting the beam, with the best performance, in the measured beams to receive the transmission signal.

Embodiment 5

In this embodiment, the cell is formed into a 120-degree sector cell, that is, the cell covers a horizontal range of 120 degrees, and based on the sector cell in this form, a 360-degree range can be covered by three sectors to form a base station. In this embodiment, the mode type of the sector cell may be defined as a type B sector, where the directional angles of the type B sectors are 60 degrees, 180 degrees, and 300 degrees. In addition, a coverage area of the sector cell includes three different SSB beam coverage. The beam width of each SSB is about 40 degrees; there are three sending directions; and coverage of covering one cell by three SSB beams has three types, as shown in FIG. 17.

In a type B sector cell of 120 degrees, three SSB beam coverage are included, and three SSB beam coverage are respectively:

SSB-1, the beam direction of which is 40 degrees and the beam width of which is 40 degrees;

SSB-2, the beam direction of which is 0 degree and the beam width of which is 40 degrees;

SSB-3, the beam direction of which is −40 degrees and the beam width of which is 40 degrees.

In addition, it should be noted that, for convenience of description, the beam direction is relative to a sector direction, that is, a direction same as the sector direction is defined as 0 degree.

In this embodiment, a 360-degree area is formed of three sector cells, each of which is 120 degrees. The beam information sent in each sector cell may be defined in the foregoing manner. As shown in FIG. 17, the sector cells included in the 360-degree full-range cell are B1, B2 and B3 according to different positions of the sector cells. Optionally, in order to maximize the performance of the SFN, the numbering values of SSB beams in adjacent sectors are the same, and the sending time instants are the same, so that the purpose of merging two SSBs among the sectors can be achieved. That is, specifically, when the plurality of sector cells enclose to form a 360-degree cell, the adjacent sector cells are in adjacent regions, and transmit beams at the same time, and the transmission information on the transmitted beams is the same, so that the combination of the transmission beams among the sectors is realized.

It should be noted that, when the sending duration of each beam is coordinated, optionally, the unit of the sending duration may be a slot (such as when a subcarrier spacing is 15 kHz, a time length of a slot is 1 ms), of course, the unit may be other lengths, such as a symbol, and the subcarrier spacing may also be another value, such as 30 kHz, 60 kHz, 120 kHz, or the like, which is not limited in the present disclosure.

Based on the mode type in the foregoing embodiment, the beam signal transmission method according to the embodiments of the present disclosure specifically includes:

obtaining, by the base station (i.e., the network-side node), the mode information of the sending beam.

Specifically, according to the above description, the mode information may be determined by means of distributed negotiation or centralized coordination. Optionally, beam transmission between base stations/cells participating in the SFN mode transmission needs to be coordinated and synchronized, and mode information of sending beams of each base station is determined.

Optionally, in this embodiment, the mode information includes and is not limited to at least one of: the sending sequence of the plurality of beams, the number of sending beams required in one sending period, the beam direction of each beam, the width of each beam and the sending duration of each beam.

Further, in this embodiment, in addition to the above information, the mode information may further include a sector direction angle, a sector width, etc., for indicating the type of the sector cell.

Specifically, the mode information may indicate the sector type of the transmitted beam and the beam pattern of the transmitted beam in the sector type by indicating one of the above mode types B1, B2, and B3.

Optionally, the mode information may further include at least one of: the identification information of the base station, the period information of the sending beams, and the period offset value of the sending period.

For example, the information included in the mode information may be in the form of Table 6 as follows:

TABLE 6

| Items of contents of the mode information | Parameter value | Description |
|---|---|---|
| Cell ID | Integer type | A cell beam transmission parameter with the identity being this value; the ID is an identifier value known among base stations |

TABLE 6-continued

| Items of contents of the mode information | Parameter value | Description |
|---|---|---|
| Sector cell information | Types {B1, B2, B3} | Types of sector cells, including a sector direction (such as 60 degrees, 180 degrees, and 300 degrees), a second width (such as 120 degrees), and composition of SSB beams |
| The number of SSB beams in a sector cell | N = 3 | Configurable, which is assumed to be 3, i.e., one cell is covered by 3 SSB beams |
| Sending period/ duration | Period T, period offset O; | The unit is a slot, the number of sending slots of each beam is: rounding (T/N); a sending sequence is: SSB-1, SSB-2, . . . SSB-N |

It should be noted that, in the information included in the foregoing mode information, the mode information of the sending beam is indicated by indicating the mode type (i.e. one of B1, B2, and B3) of the sector cell, for example, indicating the maximum number of beams, the directional angle of each beam, the width of the beam, a beam numbering value, the directional angle of a sector cell, a width of a sector, and the like. In addition to using the indication method, each piece of beam information corresponding to the mode type may also be defined item by item and indicated in the mode information, without indicating the mode type of the cell, which is not limited herein.

Optionally, in an embodiment, the beam width may be indicated to the terminal by means of an indication method, and in another embodiment, a default calculation method may also be used.

Optionally, in an embodiment, the beam width may be indicated to the terminal by means of an indication method, and in another embodiment, a default calculation method may also be used.

On the basis of the obtained mode information, the base station sequentially sends a signal or data through each beam in a time division manner according to the mode information, that is, sends the transmission signal For example, as shown in FIG. 18, after the sector cell numbered 1 receives the mode information, the sector cell numbered 1 determines that the sector cell has three beam coverage, and the information is:

the SSB-1 beam: a direction of which is 40 degrees, a width of which is 40 degrees;

the SSB-2 beam: a direction of which is 0 degree, a width of which is 40 degrees;

the SSB-3 beam: a direction of which is −40 degrees, a width of which is 40 degrees.

In addition, in one sector cell, the transmission period of the beam signal is 3 slots, the signal is sent on the slot 0 in the direction and the width of the SSB-1 beam, the signal is sent on the slot 1 in the direction and the width of the SSB-2 beam, and the signal is sent on the slot 2 in the direction and the width of the SSB-3 beam.

Beam signals are sent by using the above mode information, as shown in FIG. 19, terminals at C1, C2 and C3 of the edges of the cell have the received signal power 4.5, and relative to the received power 3 of the sector-cell-level SFN, a performance gain of 1.7 dB may exist. The terminals at D1, D2 and D3 of the edges of the cell have the received signal power of 18, and the received power of the cell-level SFN is 3. Relative to the received power of the cell-level SFN, a gain of 7.8 dB exists.

After the terminal obtains the mode information of the sending beams from the base station, the transmission signals on the beams are measured according to the plurality of beams indicated by the mode information.

Specifically, measuring the transmission signals on the beams according to the plurality of beams indicated by the mode information includes:

according to the obtained beam information, measuring the received plurality of beams respectively, and selecting the beam, with the best performance, in the measured beams to receive the transmission signal.

Embodiment 6

This embodiment combines the embodiment 4 and the embodiment 5. Switching may be performed between the beams of the two modes in the 120-degree sector cell.

In the above embodiments 4 and 5: there are the following cases at vertexes (C1, C2, 2, C3, D1, D2, D3) of the hexagonal cell:

in embodiment 4, the A-type sector cell is used, and the SFN cell is formed by the beam patterns of the SSB beams of the A-type sector. On this basis, the gain at the vertexes C1, C2, and C3 is 7.8 dB, and the gain at the vertexes D1, D2, and D3 is 1.7 dB, that is, the gain of the vertex C is greater than the gain of the vertex D;

in embodiment 5, the B-type sector cell is used, and the SFN cell is formed by the beam patterns of the SSB beams of the B-type sector. The gain at the vertexes C1, C2, and C3 is 1.7 dB, and the gain at the vertexes D1, D2, and D3 is 7.8 dB, that is, the gain of the vertex D is greater than the gain of the vertex C.

In order to enable coverage performance gains at the cell edges to be close to each other. In this embodiment, two beam switching methods are used to form a cell/SFN region.

In this embodiment, the mode types sent by the mode information may include one of A1, A2 and A3, and one of B1, B2 and B3, and beam switching of the two mode types in one sending period.

Optionally, in this embodiment, the mode information includes and is not limited to at least one of: the sending sequence of the plurality of beams, the number of sending beams required in one sending period, the beam direction of each beam, the width of each beam and the sending duration of each beam. The mode information is used to indicate one of the mode types B1, B2, and B3, and is used to indicate one of the mode types A1, A2, and A3, such as indicating the mode type A1 and the mode type B1.

Further, in this embodiment, in addition to the above information, the mode information may further include a sector direction angle, a sector width, etc., for indicating the type of the sector cell.

Optionally, the mode information may further include at least one of: the identification information of the base station, the period information of the sending beams, and the period offset value of the sending period.

Optionally, the mode information may indicate the mode information by indicating the mode type of the cell, for example, by indicating the mode identifiers of the above mode types A1 and B1, indicating the sector direction angle, the sector width, the sending sequence of the plurality of beams, the number of sending beams required in one sending period, the beam direction of each beam, the width of each beam and the sending duration of each beam.

For example, the information included in the mode information may be in the form of Table 7 as follows:

TABLE 7

| Items of contents of the mode information | Parameter value | Description |
|---|---|---|
| Cell ID | Integer type | A cell beam transmission parameter with the identity being this value; the ID is an identifier value known among base stations |
| Types for forming a sector cell | {A1, A2, A3}, {B1, B2, B3} | A manner of forming each sector by different SSB beams, and composing different types of corresponding sectors. One of the two types is selected. |
| Actual number of SSB beams | N = 6 | Configurable, which is assumed to be 36, i.e., one cell is covered by 6 SSB beams |
| Sending period/ duration | Period T, period offset O; | The unit is a slot, the number of sending slots of each beam is: rounding (T/N); a sending sequence is: SSB-1, SSB-2, . . . SSB-N |

In this example, mode information sent to the terminal is defined by defining two sector cell types, a type B (B1, B2, B3) and a type A (A1, A2, A3), and the defined types include beam information of the cell (e.g. a sector direction angle, a sector width, the maximum number of beams, a direction angle of each beam, a beam width, a numbering value of a beam, etc.) to facilitate implementation and understanding. In addition, the beam information may also be indicated in a manner of defining the beam information in the mode information item by item, without defining the sector cell types.

Optionally, in an embodiment, the beam width may be indicated to the terminal by means of an indication method, and in another embodiment, a default calculation method may also be used.

On the basis of the obtained mode information, the base station sequentially sends a signal or data through each beam in a time division manner according to the mode information, that is, sends the transmission signal.

Figure 20:
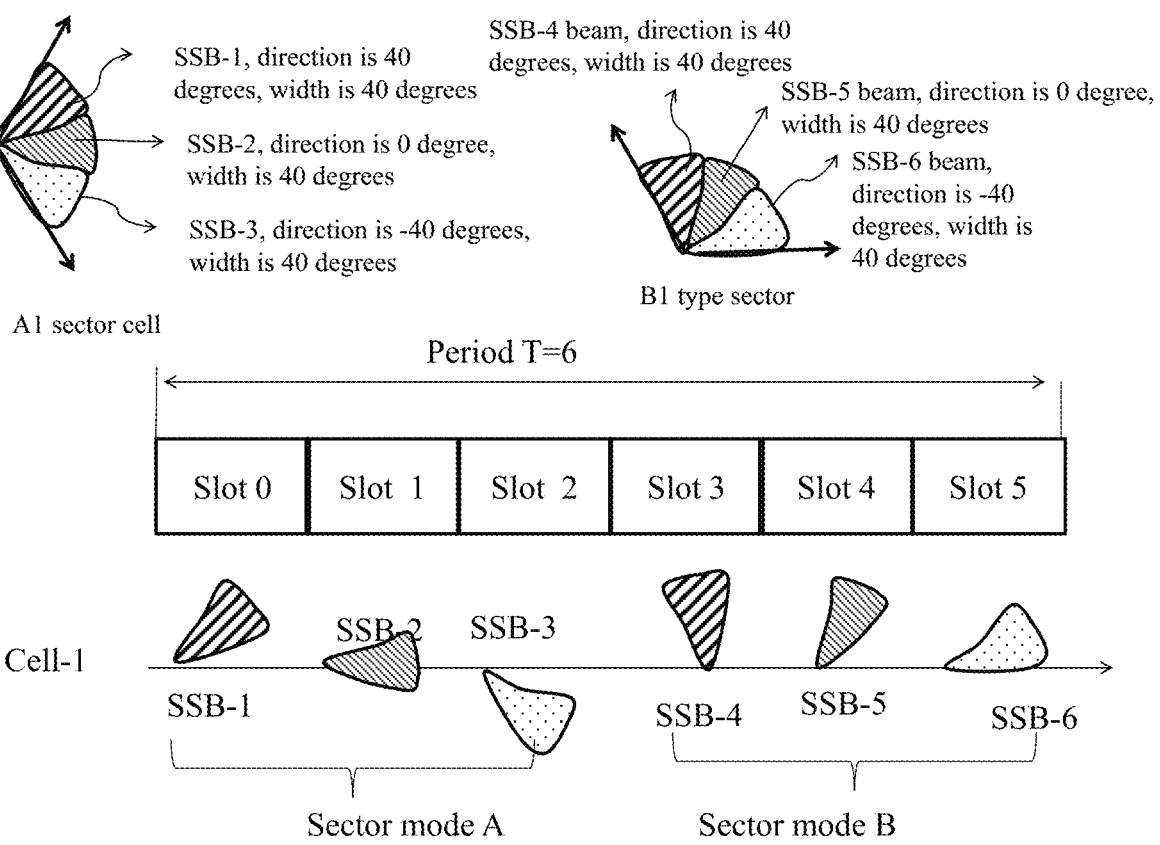
FIG. 20 to FIG. 21 illustrate schematic diagrams of a mode structure of a beam signal in Embodiment 6.

As shown in FIG. 20, according to the obtained mode information, it is determined that there are two mode types in the present cell sector, and the mutual switching. Specific description is as follows:

sector mode A: the sector direction of which is 0 degree, wherein the SSB-1 beam has a direction of 40 degrees and a width of 40 degrees; the SSB-2 beam has a direction of 0 degree and a width of 40 degrees; the SSB-3 beam has a direction of −40 degrees and a width of 40 degrees;

sector mode B: the sector direction of which is 60 degrees, wherein the SSB-4 beam has a direction of 40 degrees and a width of 40 degrees; the SSB-5 beam has a direction of 0 degree and a width of 40 degrees; the SSB-6 beam has a direction of −40 degrees and a width of 40 degrees.

It should be noted that the beam direction is a direction relative to the sector.

In addition, the sending period of the beams is 6 slots, where the signal is sent on the slot 0 in the direction and the width of the SSB-1 beam, the signal is sent on the slot 1 in the direction and the width of the SSB-2 beam, the signal is sent on the slot 2 in the direction and the width of the SSB-3 beam, the signal is sent on the slot 3 in the direction and the width of the SSB-4 beam, the signal is sent on the slot 4 in the direction and the width of the SSB-5 beam, the signal is sent on the slot 5 in the direction and the width of the SSB-6 beam, and so on. Using this method, beams in each period are sent sequentially.

After the terminal obtains the mode information of the sending beams of the base station, the terminal measures the transmission signals on the beams according to the plurality of beams indicated by the mode information.

Specifically, in one embodiment, measuring the transmission signals on the beams according to the plurality of beams indicated by the mode information includes:

measuring the beams respectively according to the beam information of the beams indicated by different mode types, obtaining measurement results;

selecting at least one beam to perform reception of the transmission signals, from the beams of different mode types according the measurement results.

Optionally, when selecting at least one beam to perform reception of the transmission signals from the beams of different mode types, the beam, with the best performance, is selected to perform the reception of the transmission signals, from the measured beams of each mode type.

In this embodiment, beams of a plurality of SSBs need to be measured, and a SSB beam with a better performance can be selected to receive a signal or data. For example, the terminal at the C1 point selects the beam direction of the SSB-1 to receive the signal and the data, or receives the data and the signal in the beam direction of the SSB-1. For example, the terminal at the point D1 selects the beam direction of the SSB-5 to receive the signal and the data, or receives the data and the signal in the beam direction of the SSB-5.

In another embodiment, measuring the transmission signals on the beams according to the plurality of beams indicated by the mode information includes:

measuring each beam in target beam pair information in a plurality of pieces of beam pair information, to obtain a transmission signal on each measured beam;

wherein an area where the terminal is located is within a coverage range of beams included in the target beam pair information.

In this embodiment, the beams of the two mode types need to be measured respectively, the beams of the two mode types are distinguished, and the beams with better signals are selected in the two mode types to receive the signals and the data respectively.

In this embodiment, the base station needs to send beam information of beams indicated by different mode types to the terminal, so that the terminal distinguishes the beams of the two different mode types.

Optionally, the base station may further send a plurality of pieces of beam pair information to the terminal, wherein each piece of beam pair information includes beam information of at least two beams, at least two beams in the same beam pair information belong to different mode types, respectively, and in one sending period, at least two beams of the same beam pair are respectively sent at different time instants and cover the same area of a signal coverage range.

The base station sends the beam pair information to the terminal, so that the terminal can determine the beam to be measured, according to the received beam pair information.

Specifically, the terminal performs beam measurement in a manner which is the same as that illustrated in embodiment 3, and will not be described in detail herein.

Figure 21:
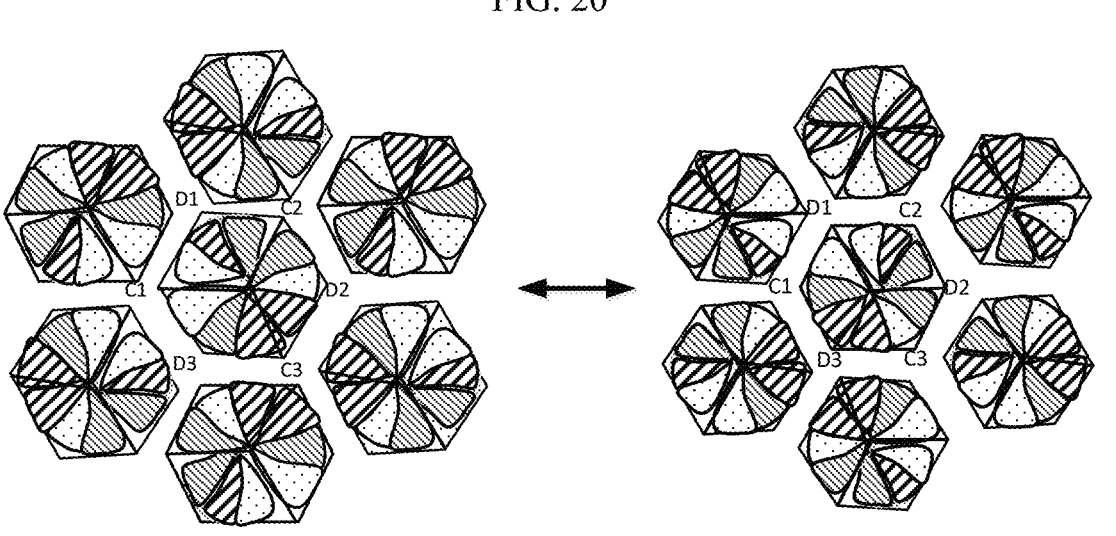

As shown in FIG. 21, by using the beam signal transmission method according to embodiment 6 and the beam switching method, sending beams in a SFN area have a mode type A in the first half period in one sending period, and sending beams in a SFN area have a mode type B in the second half period in the one sending period. Beams of the two mode types are switched in one sending period, so that terminals at cell edges such as C1, C2 and C3 and D1, D2 and D3 have no difference in performance, and the received signal powers of the terminals 11.25 dB. Relative to the received signal power 3 of the cell-level SFN technology, the performance gain is about 5.7 dB.

Figure 22:
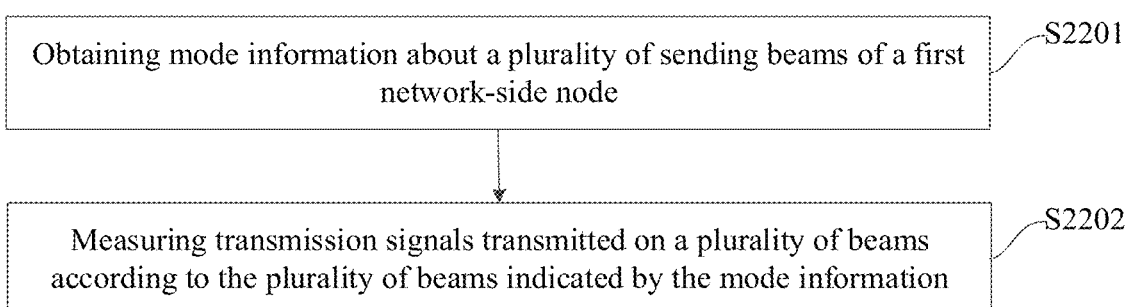
FIG. 22 is a schematic flowchart of a beam signal transmission method according to another embodiment of the present disclosure.

Another aspect of the present disclosure further provides a beam signal transmission method performed by a terminal, as shown in FIG. 22, the method includes:

S2201: obtaining mode information about a plurality of sending beams of a first network-side node;

S2202: measuring transmission signals transmitted on a plurality of beams according to the plurality of beams indicated by the mode information.

According to the beam signal transmission method in this embodiment, the first network-side node sequentially sends the transmission signals through the beams according to the mode information. On this basis, coordination and synchronization of sending the transmission signals by the plurality of network-side nodes are ensured, and the terminal measures the signals according to the beams indicated by the mode information, to ensure that the received signals of the terminal located at the cell edge are superposed to obtain the gain generated by using the SFN technology, so as to meet the requirement of the NR network deployment for covering a terminal at the cell edge.

Optionally, according to the beam signal transmission method of the embodiments of the present disclosure, the mode information includes at least one of following information:

identification information of the first network-side node;

the number of beams that need to be sent within a sending period;

a beam direction of each beam;

a beam width of each beam;

a sending duration of each beam;

a mode type of the mode information;

periodic information of the sending period;

a period offset value of sending each beam;

a sending sequence of the plurality of beams within a sending period.

Optionally, according to the beam signal transmission method, the mode information includes a mode type, and the mode type indicates a corresponding sending sequence of a plurality of beams, the number of beams that need to be sent in one sending period, a beam direction of each beam, a width of each beam, and a sending duration of each beam.

Optionally, according to the beam signal transmission method, wherein the mode information includes at least two mode types, wherein at least one of the sending sequence of sending beams, the number of beams needing to be sent in one sending period, the beam direction of each beam, the width of each beam, and the sending duration of each beam corresponding to one of the at least two mode types is different from a corresponding one of another of the at least two mode types.

Optionally, the beam signal transmission method further includes: obtaining at least one of following information sent by the first network-side node to the terminal:

beam information of beams indicated by different mode types;

a plurality of pieces of beam pair information, wherein each piece of beam pair information includes beam information of at least two beams, at least two beams in the same beam pair information belong to different mode types, respectively, and in one sending period, at least two beams of the same beam pair are respectively sent at different time instants and cover the same area of a signal coverage range.

Optionally, according to the beam signal transmission method, measuring the transmission signals on the plurality of beams according to the plurality of beams indicated by the mode information includes:

measuring the plurality of reception beams according to the beam information of the beams indicated by the different mode types, to obtain measurement results;

selecting at least one beam from the beams of different mode types to receive the transmission signals, according to the measurement results.

Optionally, according to the beam signal transmission method, measuring the transmission signals on the plurality of beams according to the plurality of beams indicated by the mode information includes:

measuring each beam in target beam pair information in a plurality of pieces of beam pair information, to obtain a transmission signal on each measured beam;

wherein an area where the terminal is located is within a coverage range of beams included in the target beam pair information.

Optionally, according to the beam signal transmission method, the transmission signals include at least one of a synchronization signal and system information.

Figure 23:
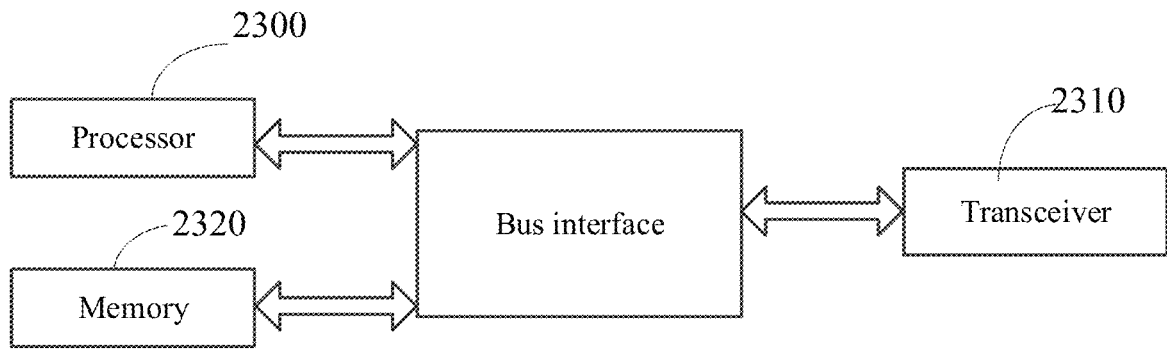
FIG. 23 is a schematic structural diagram of a network-side node according to an embodiment of the present disclosure.

As shown in FIG. 23, an embodiment of the present disclosure further provides a network-side node, the network-side node is the first network-side node. The network-side node includes: a processor 2300, a transceiver 2310, a memory 2320, and a program stored on the memory 2320 and executable by the processor 2300, wherein the transceiver 2310 is connected to the processor 2300 and the memory 2320 through a bus interface, and the processor 2300 is configured to read the program in the memory to perform the following processes:

obtaining mode information about a plurality of sending beams of the first network-side node;

according to the plurality of beams indicated by the mode information, send transmission signals sequentially through each beam in a time division manner within one sending period.

Optionally, according to the network-side node, the mode information includes at least one of following information:

identification information of the first network-side node;

the number of beams that need to be sent within a sending period;

a beam direction of each beam;

a beam width of each beam;

a sending duration of each beam;

a mode type of the mode information;

periodic information of the sending period;

a period offset value of sending each beam;

a sending sequence of the plurality of beams within a sending period.

Optionally, according to the network-side node, the processor 2300 obtains the mode information by at least one of following manners:

configuring by a Multicast/Broadcast Service (MBS) control entity, an operation and maintenance platform, or one of a plurality of adjacent network-side nodes;

determining by negotiation between at least two network-side nodes in a plurality of adjacent network-side nodes within a preset range, where the first network-side node belongs to one of the plurality of adjacent network-side nodes.

Optionally, in the network-side node, the mode information includes a mode type, and the mode type indicates a sending sequence of a plurality of corresponding beams, the number of sending beams required in one sending period, a beam direction of each beam, a width of each beam, and a sending duration of each beam;

sending the transmission signals sequentially through each beam in a sending period in the time division manner according to the plurality of beams indicated by the mode information includes:

according to the sending sequence of the plurality of beams, the number of sending beams required, the beam direction of each beam, the width of each beam and the sending duration of each beam corresponding to the mode type, sending the transmission signals sequentially through each beam in the time division manner in one sending period.

Optionally, in the network-side node, the mode information includes at least two mode types, and at least one of the sending sequence of the sending beams, the number of sending beams required in one sending period, the beam direction of each beam, the width of each beam, and a sending duration of each beam corresponding to one of the at least two mode types is different from that of another mode type of the at least two mode types;

sending the transmission signals sequentially through each beam in a sending period in the time division manner according to the plurality of beams indicated by the mode information includes:

sequentially sending the transmission signals through the plurality of beams indicated by each mode type in one sending period in the time division manner in a preset sequence of the at least two mode types.

Optionally, in the network-side node, the transmission signals sent by the plurality of beams indicated by the same mode type are the same, or are the same information repeatedly sent. Transmission signals sent by the plurality of beams indicated by different mode types are different.

Optionally, in the network-side node, the beam type of each beam sent by the first network-side node is the same as the beam type of the beam sent by at least one adjacent second network-side node at a corresponding time instant, and the transmission signals being sent are the same.

Optionally, in the network-side node, the transmission signals include at least one of a synchronization signal and system information.

Optionally, in the network-side node, the processor 2300 is further configured to send at least one of following information to the terminal:

beam information of beams indicated by different mode types;

a plurality of pieces of beam pair information, wherein each piece of beam pair information includes beam information of at least two beams, at least two beams in the same beam pair information belong to different mode types, respectively, and in one sending period, at least two beams of the same beam pair are respectively sent at different time instants and cover the same area of a signal coverage range.

Optionally, in the network-side node, wherein the signal coverage range of the first network-side node is a full-angle coverage range, or a preset-angle coverage range.

The transceiver 2310 is configured to receive and send data under the control of the processor 2300.

In FIG. 23, the bus architecture may include any number of interconnected buses and bridges, specifically, various circuits such as one or more processors represented by the processor 2300 and a memory represented by the memory 2320 are linked together. The bus architecture may also link together various other circuits, such as peripheral devices, voltage regulators, and power management circuits, etc. which are well known in the art, and therefore are not further described herein. The bus interface provides an interface. The transceiver 2310 may be a plurality of elements, i.e. include a transmitter and a receiver, and provide units for communicating with various other apparatuses on a transmission medium, and these transmission media include transmission media such as a wireless channel, a wired channel, and an optical cable. The processor 2300 is responsible for managing the bus architecture and general processing, and the memory 2320 may store data used by the processor when performing an operation.

The processor 2300 may be a central processing unit (CPU), an application-specific integrated circuit (ASIC), a field-programmable gate array (FPGA), or a complex programmable logic device (CPLD), and the processor may also adopt a multi-core architecture.

Figure 24:
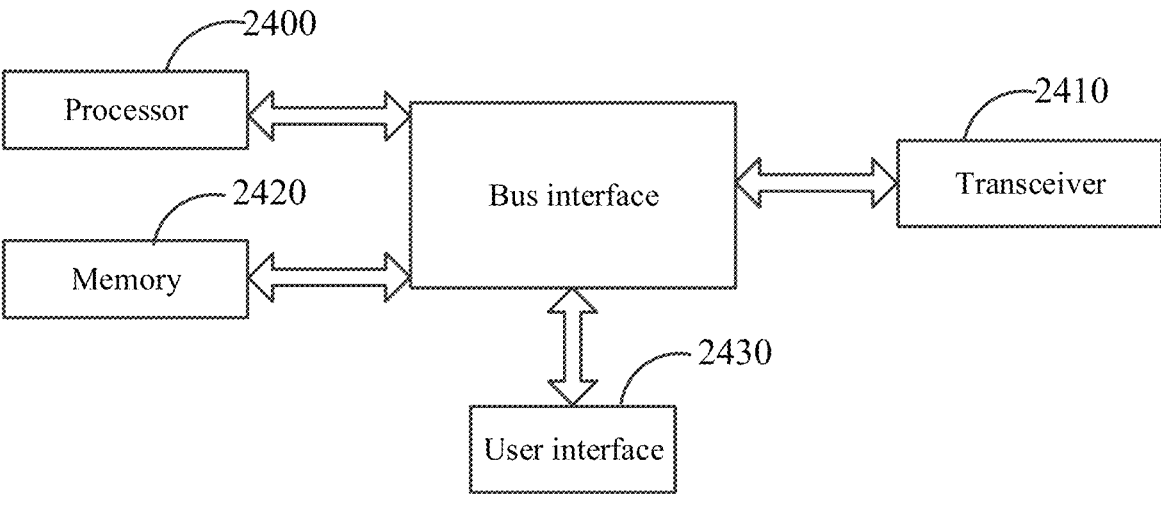
FIG. 24 is a schematic structural diagram of a terminal according to an embodiment of the present disclosure.

As shown in FIG. 24, an embodiment of the present disclosure further provides a terminal device. The terminal device includes a processor 2400, a transceiver 2410, a memory 2420, and a program stored on the memory 2420 and executable on the processor 2400, wherein the transceiver 2410 is connected to the processor 2400 and the memory 2420 through a bus interface, and the processor 2400 is configured to read a program in the memory 2420 to perform the following processes:

obtaining mode information about a plurality of sending beams of a first network-side node;

measuring transmission signals transmitted on a plurality of beams according to the plurality of beams indicated by the mode information.

Optionally, in the terminal, the mode information includes at least one of following information:

identification information of the first network-side node;

the number of beams that need to be sent within a sending period;

a beam direction of each beam;

a beam width of each beam;

a sending duration of each beam;

a mode type of the mode information;

periodic information of the sending period;

a period offset value of sending each beam;

a sending sequence of the plurality of beams within a sending period.

Optionally, in the terminal, the mode information includes a mode type, and the mode type indicates a corresponding sending sequence of a plurality of beams, the number of beams that need to be sent in one sending period, a beam direction of each beam, a width of each beam, and a sending duration of each beam.

Optionally, in the terminal, the mode information includes at least two mode types, wherein at least one of the sending sequence of sending beams, the number of beams needing to be sent in one sending period, the beam direction of each beam, the width of each beam, and the sending duration of each beam corresponding to one of the at least two mode types is different from a corresponding one of another mode type of the at least two mode types.

Optionally, in the terminal, the processor 2400 is further configured to read the program in the memory 2420 to perform the following process: obtaining at least one of following information sent by the first network-side node to the terminal:

beam information of beams indicated by different mode types;

a plurality of pieces of beam pair information, wherein each piece of beam pair information includes beam information of at least two beams, at least two beams in the same beam pair information belong to different mode types, respectively, and in one sending period, at least two beams of the same beam pair are respectively sent at different time instants and cover the same area of a signal coverage range.

Optionally, in the terminal, measuring the transmission signals on the plurality of beams according to the plurality of beams indicated by the mode information, executed by the processor 2400, includes:

measuring the plurality of reception beams according to the beam information of the beams indicated by the different mode types, to obtain measurement results;

selecting at least one beam from the beams of different mode types to receive the transmission signals, according to the measurement results.

Optionally, in the terminal, measuring the transmission signals on the plurality of beams according to the plurality of beams indicated by the mode information, executed by the processor 2400, includes:

measuring each beam in target beam pair information in a plurality of pieces of beam pair information, to obtain a transmission signal on each measured beam;

wherein an area where the terminal is located is within a coverage range of beams included in the target beam pair information.

Optionally, in the terminal, the transmission signals include at least one of a synchronization signal and system information.

The transceiver 2410 is configured to receive and send data under a control of the processor 2400.

In FIG. 24, the bus architecture may include any number of interconnected buses and bridges, specifically, various circuits such as one or more processors represented by the processor 2400 and a memory represented by the memory 2420 are linked together. The bus architecture may also link together various other circuits, such as peripheral devices, voltage regulators, and power management circuits, etc. which are well known in the art, and therefore are not further described herein. The bus interface provides an interface. The transceiver 2410 may be a plurality of elements, i.e. include a transmitter and a receiver, and provide units for communicating with various other apparatuses on a transmission medium, and these transmission media include transmission media such as a wireless channel, a wired channel, and an optical cable. In different user equipment, the user interface 2430 may be connected external or internal required devices. The connected devices include but are not limited to a keypad, a display, a speaker, a microphone, a joystick, and the like.

The processor 2400 is responsible for managing the bus architecture and general processing, and the memory 2420 may store data used by the processor when performing an operation.

Optionally, the processor 2400 may be a central processing unit (CPU), an application-specific integrated circuit (ASIC), a field-programmable gate array (FPGA), or a complex programmable logic device (CPLD), and the processor may also adopt a multi-core architecture.

The processor is configured to, by invoking the computer program stored in the memory, perform any of the methods provided in the embodiments of the present disclosure according to the obtained executable instructions. The processor and the memory may also be physically separately arranged.

It should be noted that, the above-mentioned terminal provided in the embodiments of the present disclosure can implement all method steps implemented by the foregoing method embodiments, and can achieve the same technical effect, and the same parts between the method embodiments and this embodiment and beneficial effects of this embodiment are not described in detail herein.

Figure 25:
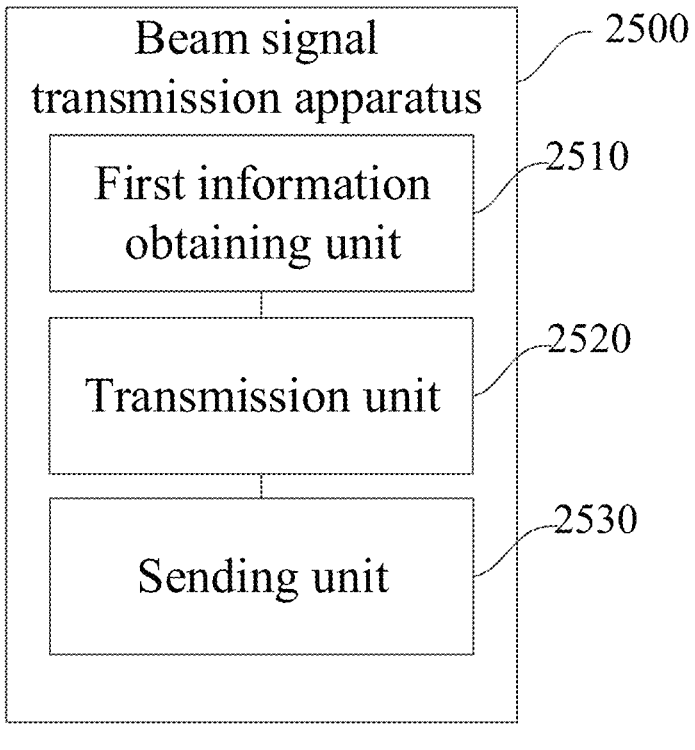
FIG. 25 is a schematic structural diagram of a beam signal transmission apparatus according to an embodiment of the present disclosure.

As shown in FIG. 25, an embodiment of the present disclosure further provides a beam signal transmission apparatus, which is applied to a first network-side node, and the beam signal transmission apparatus includes:

a first information obtaining unit 2510, configured to obtain mode information about a plurality of sending beams of the first network-side node;

a transmission unit 2520, configured to according to the plurality of beams indicated by the mode information, send transmission signals sequentially through each beam in a time division manner within one sending period.

Optionally, in the beam signal transmission apparatus, the mode information includes at least one of following information:

identification information of the first network-side node;

the number of beams that need to be sent within a sending period;

a beam direction of each beam;

a beam width of each beam;

a sending duration of each beam;

a mode type of the mode information;

periodic information of the sending period;

a period offset value of sending each beam;

a sending sequence of the plurality of beams within a sending period.

Optionally, in the beam signal transmission apparatus, the first information obtaining unit 2510 obtains the mode information by at least one of following manners:

configuring by a Multicast/Broadcast Service (MBS) control entity, an operation and maintenance platform, or one of a plurality of adjacent network-side nodes;

determining by negotiation between at least two network-side nodes in a plurality of adjacent network-side nodes within a preset range, where the first network-side node belongs to one of the plurality of adjacent network-side nodes.

Optionally, in the beam signal transmission apparatus, the mode information includes a mode type, and the mode type indicates a corresponding sending sequence of a plurality of beams, the number of sending beams required in one sending period, a beam direction of each beam, a width of each beam, and a sending duration of each beam;

sending the transmission signals sequentially through each beam in a sending period in the time division manner according to the plurality of beams indicated by the mode information includes:

according to the sending sequence of the plurality of beams, the number of sending beams required, the beam direction of each beam, the width of each beam and the sending duration of each beam corresponding to the mode type, sending the transmission signals sequentially through each beam in the time division manner in one sending period.

Optionally, in the beam signal transmission apparatus, the mode information includes at least two mode types, and at least one of the sending sequence of the sending beams, the number of sending beams required in one sending period, the beam direction of each beam, the width of each beam, and a sending duration of each beam corresponding to one of the at least two mode types is different from that of another mode type of the at least two mode types;

sending the transmission signals sequentially through each beam in a sending period in the time division manner according to the plurality of beams indicated by the mode information includes:

sequentially sending the transmission signals through the plurality of beams indicated by each mode type in one sending period in the time division manner in a preset sequence of the at least two mode types.

Optionally, in the beam signal transmission apparatus, the transmission signals sent by the plurality of beams indicated by the same mode type are the same, or are the same information repeatedly sent. Transmission signals sent by the plurality of beams indicated by different mode types are different.

Optionally, in the beam signal transmission apparatus, the beam type of each beam sent by the first network-side node is the same as the beam type of the beam sent by at least one adjacent second network-side node at a corresponding time instant, and the transmission signals being sent are the same.

Optionally, in the beam signal transmission apparatus, the transmission signals include at least one of a synchronization signal and system information.

Optionally, the beam signal transmission apparatus further includes: a sending unit 2530, configured to send at least one of following information to the terminal:

beam information of beams indicated by different mode types;

a plurality of pieces of beam pair information, wherein each piece of beam pair information includes beam information of at least two beams, at least two beams in the same beam pair information belong to different mode types, respectively, and in one sending period, at least two beams of the same beam pair are respectively sent at different time instants and cover the same area of a signal coverage range.

Optionally, in the beam signal transmission apparatus, the signal coverage range of the first network-side node is a full-angle coverage range, or a preset-angle coverage range.

Figure 26:
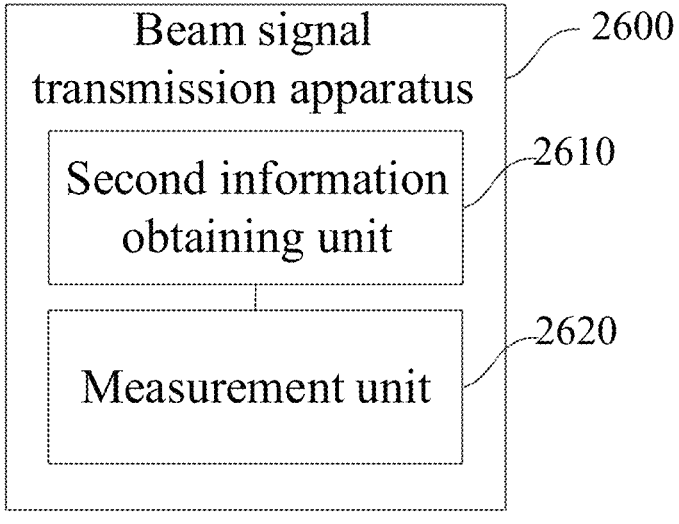
FIG. 26 is a schematic structural diagram of a beam signal transmission apparatus according to another embodiment of the present disclosure.

As shown in FIG. 26, an embodiment of the present disclosure further provides a beam signal transmission apparatus, which is applied to a terminal, wherein the beam signal transmission apparatus 2600 includes:

a second information obtaining unit 2610, configured to obtain mode information about a plurality of sending beams of a first network-side node; and a measurement unit 2620, configured to measure transmission signals transmitted on a plurality of beams according to the plurality of beams indicated by the mode information.

Optionally, in the beam signal transmission apparatus, the mode information includes at least one of following information:

identification information of the first network-side node; the number of beams that need to be sent within a sending period;

a beam direction of each beam;
a beam width of each beam;
a sending duration of each beam;
a mode type of the mode information;
periodic information of the sending period;
a period offset value of sending each beam;
a sending sequence of the plurality of beams within a sending period.

Optionally, in the beam signal transmission apparatus, the mode information includes a mode type, and the mode type indicates a corresponding sending sequence of a plurality of beams, the number of beams that need to be sent in one sending period, a beam direction of each beam, a width of each beam, and a sending duration of each beam.

Optionally, in the beam signal transmission apparatus, the mode information includes at least two mode types, wherein at least one of the sending sequence of sending beams, the number of beams needing to be sent in one sending period, the beam direction of each beam, the width of each beam, and the sending duration of each beam corresponding to one of the at least two mode types is different from a corresponding one of another mode type of the at least two mode types.

Optionally, in the beam signal transmission apparatus, the second information obtaining unit 2610 is further configured to obtain at least one of following information sent by the first network-side node to the terminal:

beam information of beams indicated by different mode types;

a plurality of pieces of beam pair information, wherein each piece of beam pair information includes beam information of at least two beams, at least two beams in the same beam pair information belong to different mode types, respectively, and in one sending period, at least two beams of the same beam pair are respectively sent at different time instants and cover the same area of a signal coverage range.

Optionally, in the beam signal transmission apparatus, measuring the transmission signals on the plurality of beams according to the plurality of beams indicated by the mode information, executed by the measurement unit 2620, includes:

measuring the plurality of reception beams according to the beam information of the beams indicated by the different mode types, to obtain measurement results;

selecting at least one beam from the beams of different mode types to receive the transmission signals, according to the measurement results.

Optionally, in the beam signal transmission apparatus, measuring the transmission signals on the plurality of beams according to the plurality of beams indicated by the mode information, executed by the measurement unit 2620, includes:

measuring each beam in target beam pair information in a plurality of pieces of beam pair information, to obtain a transmission signal on each measured beam;

wherein an area where the terminal is located is within a coverage range of beams included in the target beam pair information.

Optionally, in the beam signal transmission apparatus, the transmission signals include at least one of a synchronization signal and system information.

It should be noted that, the beam signal transmission method and the beam signal transmission apparatus according to the embodiments of the present disclosure are based on the same application concept, and the implementations of the apparatus and the method may be obtained by referring to each other since the method and the apparatus solve the problem by using similar principles. Details are not described herein again.

It should be noted that, the division of the units in the embodiments of the present disclosure is schematic, but is merely a logical function division, and there may be another division manner in actual implementation. In addition, functional units in the embodiments of the present disclosure may be integrated into one processing unit, or each of the units may exist alone physically, or two or more units may be integrated into one unit. The integrated unit may be implemented in the form of hardware, or may be implemented in the form of a software functional unit.

When the integrated unit is implemented in the form of a software functional unit and sold or used as an independent product, the integrated unit may be stored in a processor-readable storage medium. Based on such understanding, an essential part, or a part contributing to the related to, or all, of the technical solutions of the present disclosure may be embodied in the form of a software product, and the computer software product is stored in a storage medium, and includes several instructions for enabling a computer device (which may be a personal computer, a server, or a network device, etc.) or a processor to perform all or part of the steps of the method according to various embodiments of the present disclosure. The foregoing storage medium includes various media that can store program codes, such as a USB flash disk, a mobile hard disk, a read-only memory (ROM), a random access memory (RAM), a magnetic disk, or an optical disk.

Embodiments of the present disclosure further provide a processor-readable storage medium, on which a computer program is stored, wherein when the computer program is executed by a processor, the steps applied to the beam signal transmission method are implemented. The processor-readable storage medium may be any usable medium or data storage device accessible by the processor, including, but not limited to, a magnetic memory (for example, a floppy disk, a hard disk, a magnetic tape, a magneto-optical disk (MO), etc.), an optical memory (such as CD, DVD, BD, HVD, etc.), and a semiconductor memory (for example, a ROM, an EPROM, an EEPROM, a non-volatile memory (NAND FLASH), a solid state disk (SSD)), etc.

Those skilled in the art should understand that the embodiments of the present disclosure may be provided as a method, a system, or a computer program product. Thus, the present disclosure may take the form of a sole hardware embodiment, a sole software embodiment, or embodiments incorporating software and hardware aspects. Moreover, the present disclosure may take the form of a computer program product implemented on one or more computer-usable storage media (including but not limited to a disk memory and an optical memory, etc.) including computer-usable program codes.

The present disclosure is described with reference to flowcharts and/or block diagrams of methods, apparatuses (systems), and computer program products according to embodiments of the present disclosure. It should be understood that each flow and/or block in the flowchart and/or block diagrams, and combinations of flows and/or blocks in the flowcharts and/or block diagrams, can be implemented by computer-executable instructions. These computer-executable instructions may be provided to a processor of a general purpose computer, a special purpose computer, an embedded processor, or other programmable data processing device to generate a machine, such that instructions executed by the processor of the computer or other programmable data processing device generate means for implementing functions specified in one or more flows of the flowcharts and/or one or more blocks of the block diagrams.

These processor-executable instructions may also be stored in a processor-readable memory that can direct a computer or other programmable data processing device to operate in a particular manner, such that the instructions stored in the processor-readable memory produce a product that includes an instruction device that implements the functions specified in one or more flows of the flowcharts and/or one or more blocks of the block diagrams.

These processor-executable instructions may also be loaded onto a computer or other programmable data processing device, such that a series of operational steps are performed on the computer or the other programmable device to produce a computer-implemented process, such that the instructions executed on the computer or other programmable device provide steps for implementing the functions specified in one or more flows of the flowcharts and/or one or more blocks of the block diagrams.

It should be noted that, the division of the above modules is merely a division of a logical function, and all or some of the modules may be integrated onto one physical entity during actual implementation, or may be physically separated. In addition, these modules may all be implemented in the form of software invoked by a processing element, or may all be implemented in the form of hardware; or some modules may be implemented in the form of a processing element invoking software, and some of the modules are implemented in the form of hardware. For example, the determining module may be a separately set processing element, or may be integrated in a certain chip of the foregoing apparatus, and in addition, the determining module may also be stored in a memory of the apparatus in the form of program codes, and a certain processing element of the apparatus invokes and executes the functions of the determining module. Implementations of other modules are similar. In addition, all or part of these modules may be integrated together, or may be implemented independently. The processing element described herein may be an integrated circuit having a signal processing capability. In an implementation process, each step of the above-mentioned method or each of the above modules may be completed by means of an integrated logic circuit of hardware in the processor element or an instruction in a software form.

For example, various modules, units, subunits, or submodules may be one or more integrated circuits configured to implement the above method, for example, one or more application specific integrated circuits (ASICs), or one or more microprocessors (digital signal processors, DSPs), or one or more field programmable gate arrays (FPGAs), etc. For another example, when a certain module is implemented in the form of a processing element invoking program codes, the processing element may be a general-purpose processor, for example, a central processing unit (CPU) or another processor that may invoke the program codes. For another example, these modules may be integrated together and implemented in the form of a system-on-a-chip (SOC).

The terms "first", "second", and the like in the specification and claims of the present disclosure are used to distinguish similar objects, and do not need to be used to describe a specific order or sequence. It should be understood that the terms used in this way may be interchanged under appropriate circumstances so that the embodiments of the present disclosure described herein, for example, are implemented in an order other than those illustrated or described herein. Furthermore, the terms "include" and "have" and any variations thereof are intended to cover non-exclusive inclusion, for example, processes, methods, systems, products, or devices that include a series of steps or units are not necessarily limited to those steps or units clearly listed, but may include other steps or units not expressly listed or inherent to these processes, methods, products, or devices. In addition, the description and the claims use "and/or" indicate at least one of the connected objects, such as A and/or B and/or C, indicating that there are seven cases, i.e., A exists alone, B exists alone, C exists alone, both A and B exist, both B and C exist, both A and C exist, and all A, B and C exist. Similarly, the use of "at least one of A and B" in this specification and in the claims should be understood as "a single A exists, a single B exists, or both A and B exist".

Obviously, those skilled in the art may make various modifications and variations to the present disclosure without departing from the spirit and scope of the present disclosure. Thus, if these modifications and variations of the present disclosure fall within the scope of the claims and their equivalents, the present disclosure is also intended to encompass these modifications and variations.

What is claimed is:

1. A beam signal transmission method performed by a first network-side node, the method comprising:

obtaining mode information about a plurality of sending beams of the first network-side node;

sending transmission signals sequentially through each beam in a time division manner in one sending period according to the plurality of beams indicated by the mode information, wherein the mode information comprises at least one of following:

identification information of the first network-side node;

a quantity of beams to be sent within a sending period;

a beam direction of each beam;

a beam width of each beam;

a sending duration of each beam;

a mode type of the mode information;

periodic information of the sending period;

a period offset value of sending each beam; or a sending sequence of the plurality of beams within a sending period, wherein the mode information comprises one mode type, and the mode type indicates a sending sequence of the plurality of beams, a quantity of sending beams to be sent in one sending period, a beam direction of each beam, a width of each beam, and a sending duration of each beam; sending the transmission signals sequentially through each beam in the time division manner in one sending period according to the plurality of beams indicated by the mode information comprises sending the transmission signals sequentially through each beam in the time division manner in one sending period, according to the sending sequence of the plurality of beams, the quantity of beams to be sent, the beam direction of each beam, the width of each beam and the sending duration of each beam corresponding to the mode type;

or, wherein the mode information comprises at least two mode types, and the at least two mode types are different in at least one of the sending sequence of the sending beams, the quantity of sending beams to be sent in one sending period, the beam direction of each beam, the width of each beam, and the sending duration of each beam corresponding to the at least two mode types; sending the transmission signals sequentially through each beam in the time division manner in one sending period according to the plurality of beams indicated by the mode information comprises sending the transmission signals sequentially through the plurality of beams indicated by each mode type in one sending period in the time division manner and in a preset sequence of the at least two mode types.

2. The beam signal transmission method according to claim 1, wherein the mode information is obtained by at least one of following manners:

configuring by a Multicast/Broadcast Service (MBS) control entity, an operation and maintenance platform, or one of a plurality of adjacent network-side nodes;

determining by negotiation between at least two network-side nodes in a plurality of adjacent network-side nodes within a preset range, wherein the first network-side node belongs to one of the plurality of adjacent network-side nodes.

3. The beam signal transmission method according to claim 1, wherein when the mode information comprises the at least two mode types, the transmission signals sent by the plurality of beams indicated by a same mode type are same, or are same information repeatedly sent;

the transmission signals sent by the plurality of beams indicated by different mode types are different.

4. The beam signal transmission method according to claim 1, wherein a beam type of each sending beam of the first network-side node is same as a beam type of a sending beam of at least one adjacent second network-side node at a corresponding time instant, and the transmission signals being sent are same.

5. The beam signal transmission method according to claim 1, wherein the transmission signals comprise at least one of a synchronization signal and system information.

6. The beam signal transmission method according to claim 1, wherein, when the mode information comprises the at least two mode types, the method further comprises:

sending at least one of following information to the terminal:

beam information of beams indicated by different mode types;

a plurality of pieces of beam pair information, wherein each piece of beam pair information comprises beam information of at least two beams, at least two beams in same beam pair information belong to different mode types, respectively, and in one sending period, at least two beams of a same beam pair are respectively sent at different time instants and cover a same area of a signal coverage range.

7. The beam signal transmission method according to claim 1, wherein a signal coverage range of the first network-side node is a full-angle coverage range, or a preset-angle coverage range.

8. A network-side node, the network-side node being a first network-side node, comprising:

a memory, a transceiver, and a processor, wherein the memory is configured to store a computer program, the transceiver is configured to send and receive data under control of the processor, and the processor is configured to read the computer program in the memory and execute steps of the beam signal transmission method according to claim 1.

9. The network-side node according to claim 8, wherein the mode information is obtained by at least one of following manners:

configuring by a Multicast/Broadcast Service (MBS) control entity, an operation and maintenance platform, or one of a plurality of adjacent network-side nodes;

determining by negotiation between at least two network-side nodes in a plurality of adjacent network-side nodes within a preset range, wherein the first network-side node belongs to one of the plurality of adjacent network-side nodes.

10. The network-side node according to claim 8, wherein when the mode information comprises the at least two mode types, the transmission signals sent by the plurality of beams indicated by a same mode type are same, or are same information repeatedly sent;

the transmission signals sent by the plurality of beams indicated by different mode types are different.

11. The network-side node according to claim 8, wherein, when the mode information comprises the at least two mode types, the processor is configured to read the computer program in the memory and further execute following steps:

sending at least one of following information to the terminal:

beam information of beams indicated by different mode types;

a plurality of pieces of beam pair information, wherein each piece of beam pair information comprises beam information of at least two beams, at least two beams in same beam pair information belong to different mode types, respectively, and in one sending period, at least two beams of a same beam pair are respectively sent at different time instants and cover a same area of a signal coverage range.

12. A beam signal transmission method performed by a terminal, comprising:

obtaining mode information about a plurality of sending beams of a first network-side node; and measuring transmission signals on a plurality of beams according to the plurality of beams indicated by the mode information, wherein the mode information comprises at least one of following:

identification information of the first network-side node;

a quantity of beams to be sent in a sending period;

a beam direction of each beam;

a beam width of each beam;

a sending duration of each beam;

a mode type of the mode information;

periodic information of the sending period;

a period offset value of sending each beam; or, a sending sequence of the plurality of beams within a sending period, wherein the mode information comprises one mode type, and the mode type indicates a sending sequence of the plurality of beams, a quantity of sending beams to be sent in one sending period, a beam direction of each beam, a width of each beam, and a sending duration of each beam;

or, wherein the mode information comprises at least two mode types, and the at least two mode types are different in at least one of the sending sequence of the sending beams, the quantity of sending beams to be sent in one sending period, the beam direction of each beam, the width of each beam, and the sending duration of each beam corresponding to the at least two mode types.

13. The beam signal transmission method according to claim 12, wherein, when the mode information comprises the at least two mode types, the method further comprises:

obtaining at least one of following information sent by the first network-side node to the terminal:

beam information of beams indicated by different mode types;

a plurality of pieces of beam pair information, wherein each piece of beam pair information comprises beam information of at least two beams, at least two beams in same beam pair information belong to different mode types, respectively, and in one sending period, at least two beams of a same beam pair are respectively sent at different time instants and cover a same area of a signal coverage range.

14. The beam signal transmission method according to claim 13, wherein measuring the transmission signals on the plurality of beams according to the plurality of beams indicated by the mode information comprises:

measuring a plurality of reception beams according to beam information of the beams indicated by the different mode types, to obtain measurement results;

selecting at least one beam from the beams of different mode types to receive the transmission signals, according to the measurement results.

15. The beam signal transmission method according to claim 13, wherein measuring the transmission signals on the plurality of beams according to the plurality of beams indicated by the mode information comprises:

measuring each beam in target beam pair information in a plurality of pieces of beam pair information, to obtain a transmission signal on each measured beam;

wherein an area where the terminal is located is within a coverage range of beams comprised in the target beam pair information.

16. The beam signal transmission method according to claim 12, wherein the transmission signals comprise at least one of a synchronization signal and system information.

17. A terminal, comprising:

a memory, a transceiver, and a processor, wherein the memory is configured to store a computer program, the transceiver is configured to send and receive data under control of the processor, and the processor is configured to read the computer program in the memory and execute the following steps:

obtaining mode information about a plurality of sending beams of a first network-side node; and measuring transmission signals on a plurality of beams according to the plurality of beams indicated by the mode information, wherein the mode information comprises at least one of following:

identification information of the first network-side node;

a quantity of beams to be sent in a sending period;

a beam direction of each beam;

a beam width of each beam;

a sending duration of each beam;

a mode type of the mode information;

periodic information of the sending period;

a period offset value of sending each beam; or, a sending sequence of the plurality of beams within a sending period, wherein the mode information comprises one mode type, and the mode type indicates a sending sequence of the plurality of beams, a quantity of sending beams to be sent in one sending period, a beam direction of each beam, a width of each beam, and a sending duration of each beam;

or, wherein the mode information comprises at least two mode types, and the at least two mode types are different in at least one of the sending sequence of the sending beams, the quantity of sending beams to be sent in one sending period, the beam direction of each beam, the width of each beam, and the sending duration of each beam corresponding to the at least two mode types.

18. The terminal according to claim 17, wherein, when the mode information comprises the at least two mode types, the processor is configured to read the computer program in the memory and execute further the following steps:

obtaining at least one of following information sent by the first network-side node to the terminal:

beam information of beams indicated by different mode types;

a plurality of pieces of beam pair information, wherein each piece of beam pair information comprises beam information of at least two beams, at least two beams in same beam pair information belong to different mode types, respectively, and in one sending period, at least two beams of a same beam pair are respectively sent at different time instants and cover a same area of a signal coverage range.

19. The terminal according to claim 17, wherein measuring the transmission signals on the plurality of beams according to the plurality of beams indicated by the mode information comprises:

measuring a plurality of reception beams according to beam information of the beams indicated by the different mode types, to obtain measurement results;

selecting at least one beam from the beams of different mode types to receive the transmission signals, according to the measurement results.

20. The terminal according to claim 17, wherein measuring the transmission signals on the plurality of beams according to the plurality of beams indicated by the mode information comprises:

measuring each beam in target beam pair information in a plurality of pieces of beam pair information, to obtain a transmission signal on each measured beam;

wherein an area where the terminal is located is within a coverage range of beams comprised in the target beam pair information.

* * * * *